US006842854B2

(12) United States Patent
Nishihara et al.

(10) Patent No.: US 6,842,854 B2
(45) Date of Patent: Jan. 11, 2005

(54) METHOD PROGRAMMABLE LOGIC DEVICE, INFORMATION PROCESSING SYSTEM AND METHOD OF RECONFIGURING CIRCUIT FOR SEQUENTIALLY PROCESSING DATA IN BLOCKS AND TEMPORARILY STORING DATA PROCESSED UNTIL NEXT CONFIGURATION

(75) Inventors: Yoshio Nishihara, Nakai-machi (JP);
Yoshihide Sato, Nakai-machi (JP);
Norikazu Yamada, Nakai-machi (JP);
Tetsuichi Satonaga, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 601 days.

(21) Appl. No.: 09/749,471

(22) Filed: Dec. 28, 2000

(65) Prior Publication Data

US 2001/0010074 A1 Jul. 26, 2001

(30) Foreign Application Priority Data

Jan. 20, 2000 (JP) ........................................ 2000-014169

(51) Int. Cl.$^7$ .............................................. G06F 9/24
(52) U.S. Cl. ........................................ 712/228; 326/39
(58) Field of Search ....................... 712/228; 326/37–39

(56) References Cited

U.S. PATENT DOCUMENTS

| | | | | | |
|---|---|---|---|---|---|
| 5,801,547 | A | * | 9/1998 | Kean ............................. | 326/40 |
| 5,844,422 | A | * | 12/1998 | Trimberger et al. ........... | 326/38 |
| 6,091,263 | A | * | 7/2000 | New et al. ..................... | 326/40 |
| 6,507,211 | B1 | * | 1/2003 | Schultz et al. ................. | 326/37 |
| 6,553,479 | B2 | * | 4/2003 | Mirsky et al. ................. | 712/16 |

FOREIGN PATENT DOCUMENTS

| JP | 2-130023 | 5/1990 |
|---|---|---|
| JP | 10-78932 | 3/1998 |

OTHER PUBLICATIONS

S. Trimberger et al., "A Time–Multiplexed FPGA", Proceedings of FPGAs for Custom Computing Machines in 1997 (FCCM 97), pp. 22–28.

E. Tau, et al., "A First Generation DPGA Implementation", FPD '95—Third Canadian Workshop of Field Programmable Devices May 29–Jun. 1, 1995.

M. Motomura, et al., "An Embedded DRAM–FPGA Chip with Instantaneous Logic Reconfiguration", 1997 Symposium on VLSI Circuits Digest of Technical Papers, pp. 55–56.

T. Fujii, et al., "A Dynamically Reconfigurable Logic Engine with a Multi–Context/Multi–Mode Unified Cell Architecture", Digest of Technical Papers, 1999 IEEE International Solid–State Circuits Conference.

* cited by examiner

Primary Examiner—Richard L. Ellis
(74) Attorney, Agent, or Firm—Morgan Lewis Bockius LLP

(57) ABSTRACT

To provide a method of implementing cache logic technique in which total data processing time can be reduced, input data divided into block is sequentially processed in units of block in plural circuits using a programmable logic device provided with a circuit information input controller, a programmable logic circuit sector and a data cache. The plural circuits are sequentially reconfigured in the programmable logic device and execute processing per plural blocks which can be stored in the data cache. Intermediate data in units of plural blocks is stored in the data cache to be input data to a reconfigured circuit and intermediate data as the result of the processing by the reconfigured circuit is overwritten to the data cache. When the processing of the plural circuits is finished, the result of the processing is output to an external device without being stored in the data cache.

11 Claims, 28 Drawing Sheets

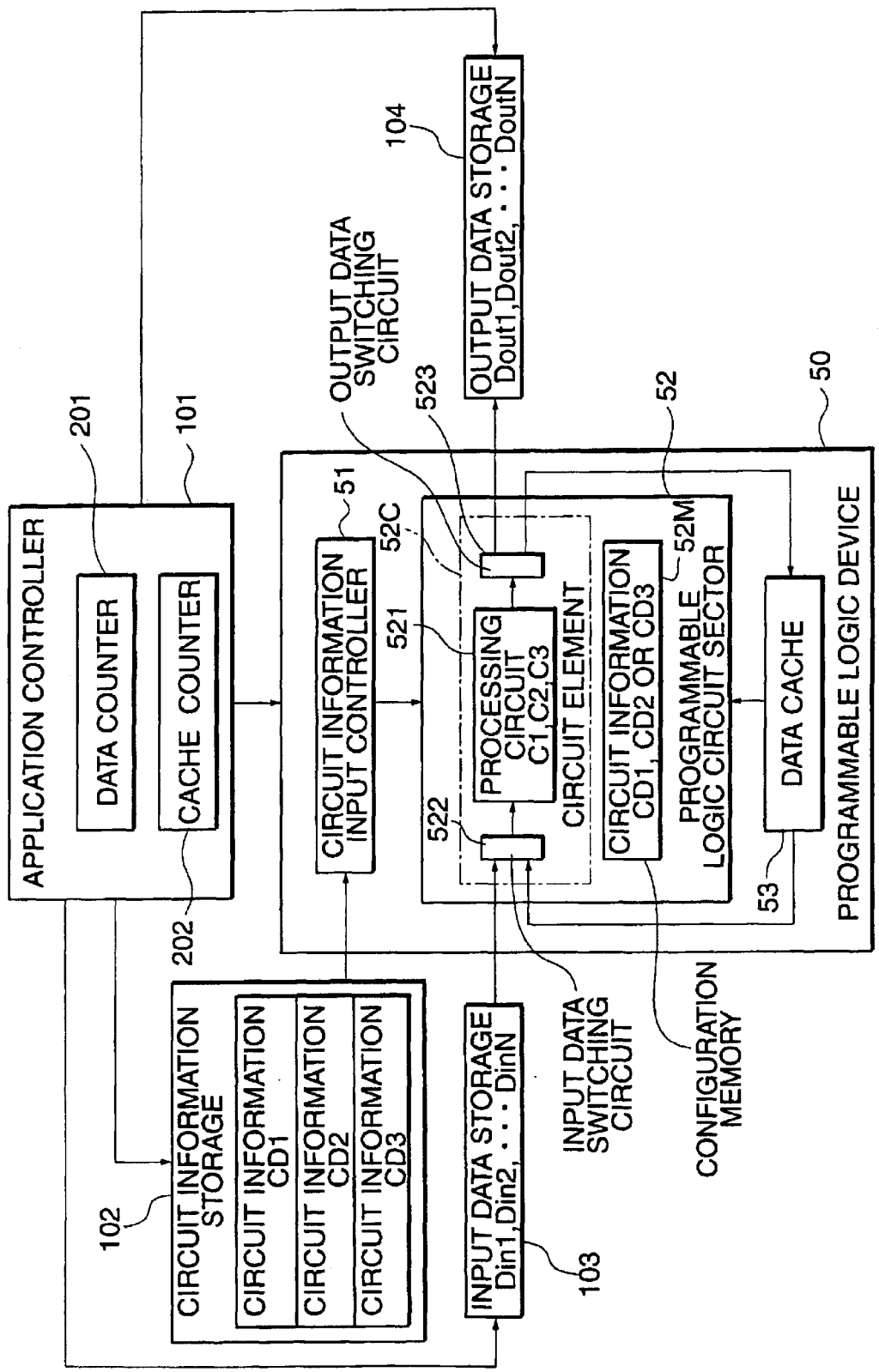

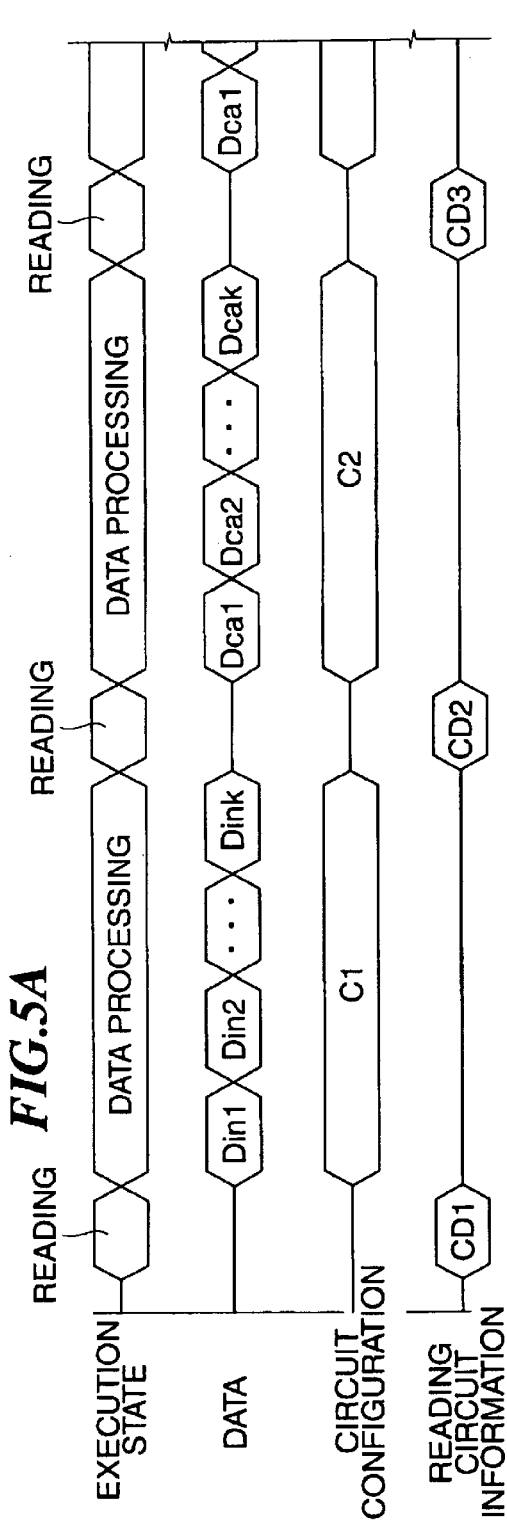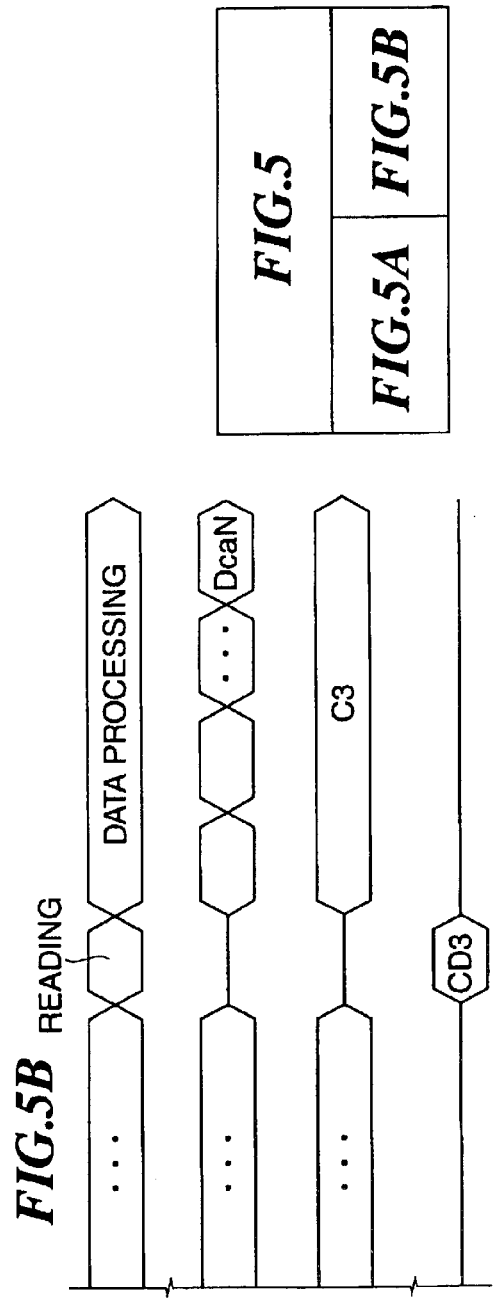

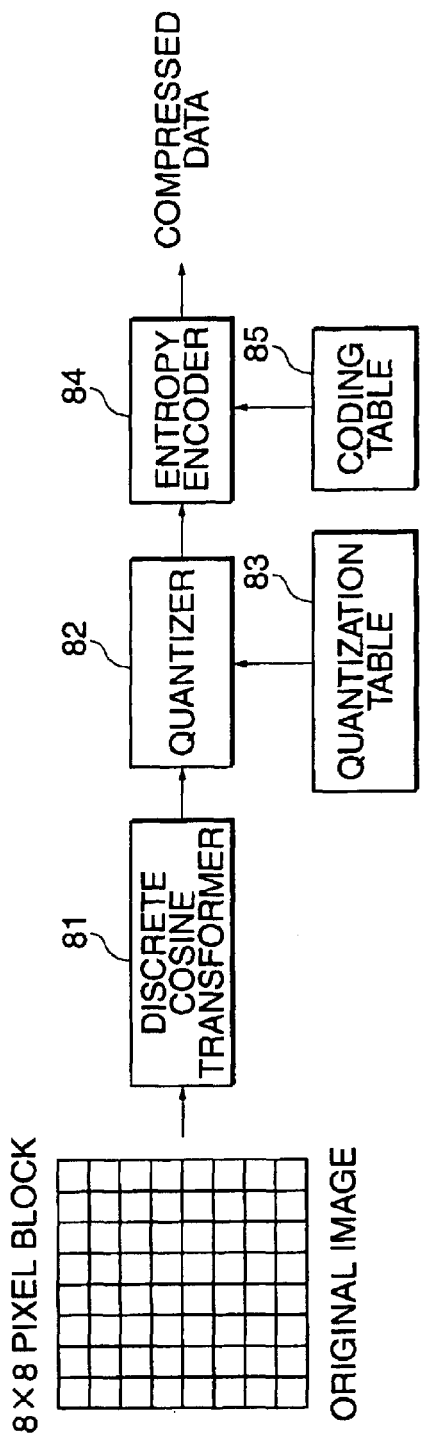

FIG.12

| | CONVENTIONAL TYPE | MULTICONTEXT | PRESENT INVENTION |
|---|---|---|---|
| CIRCUIT PERFORMANCE (1/RC TIME CONSTANT) | 1 | 2.1 | 1 |
| POWER CONSUMPTION | 1 | 1.4 | 1.2 |
| MANUFACTURING COST | 1 | 2.0 | 1.5 |

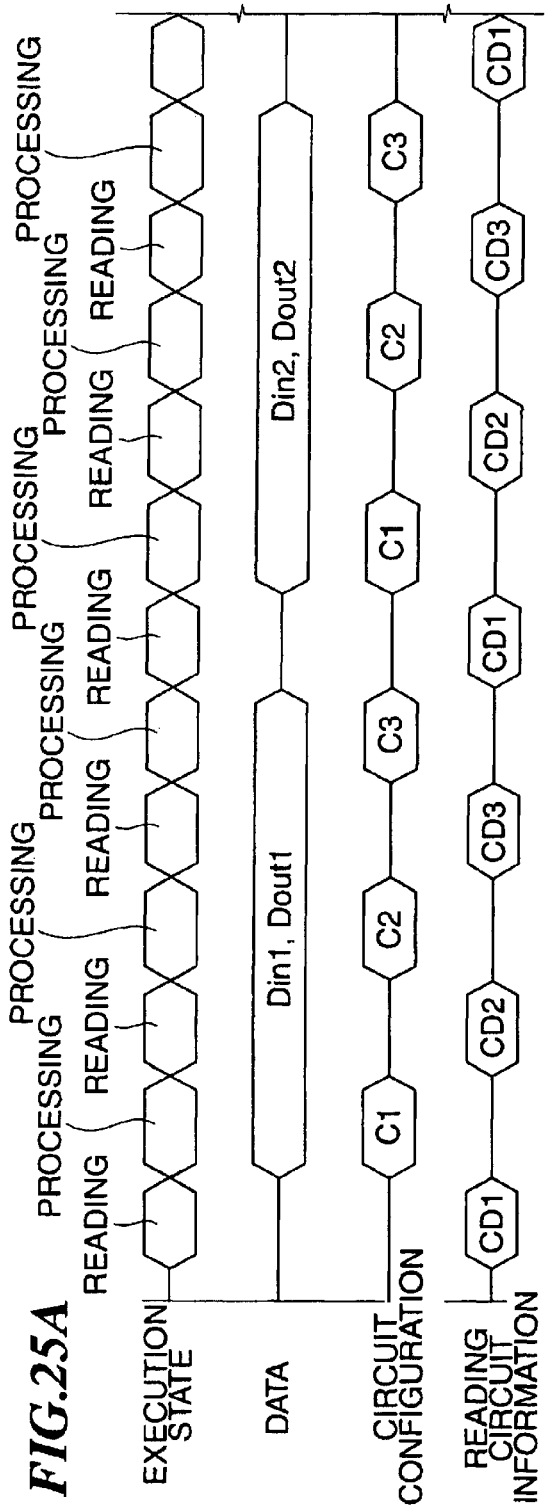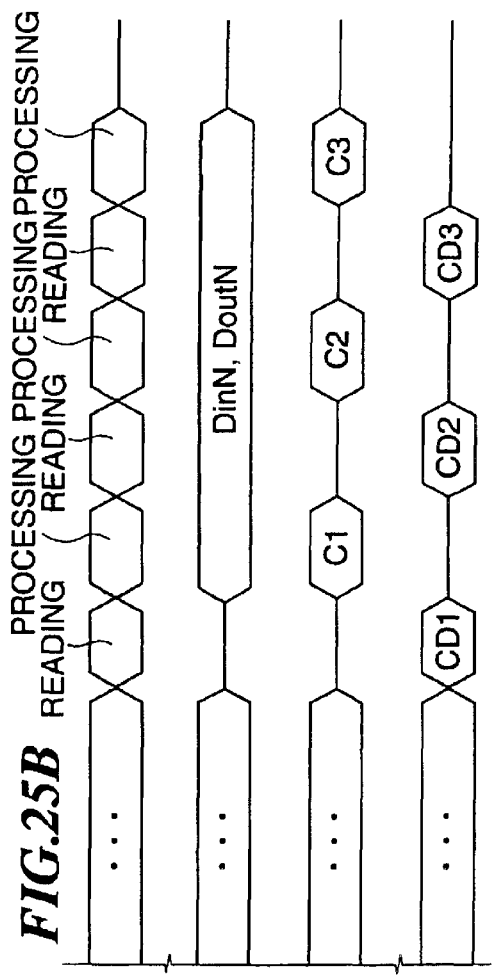

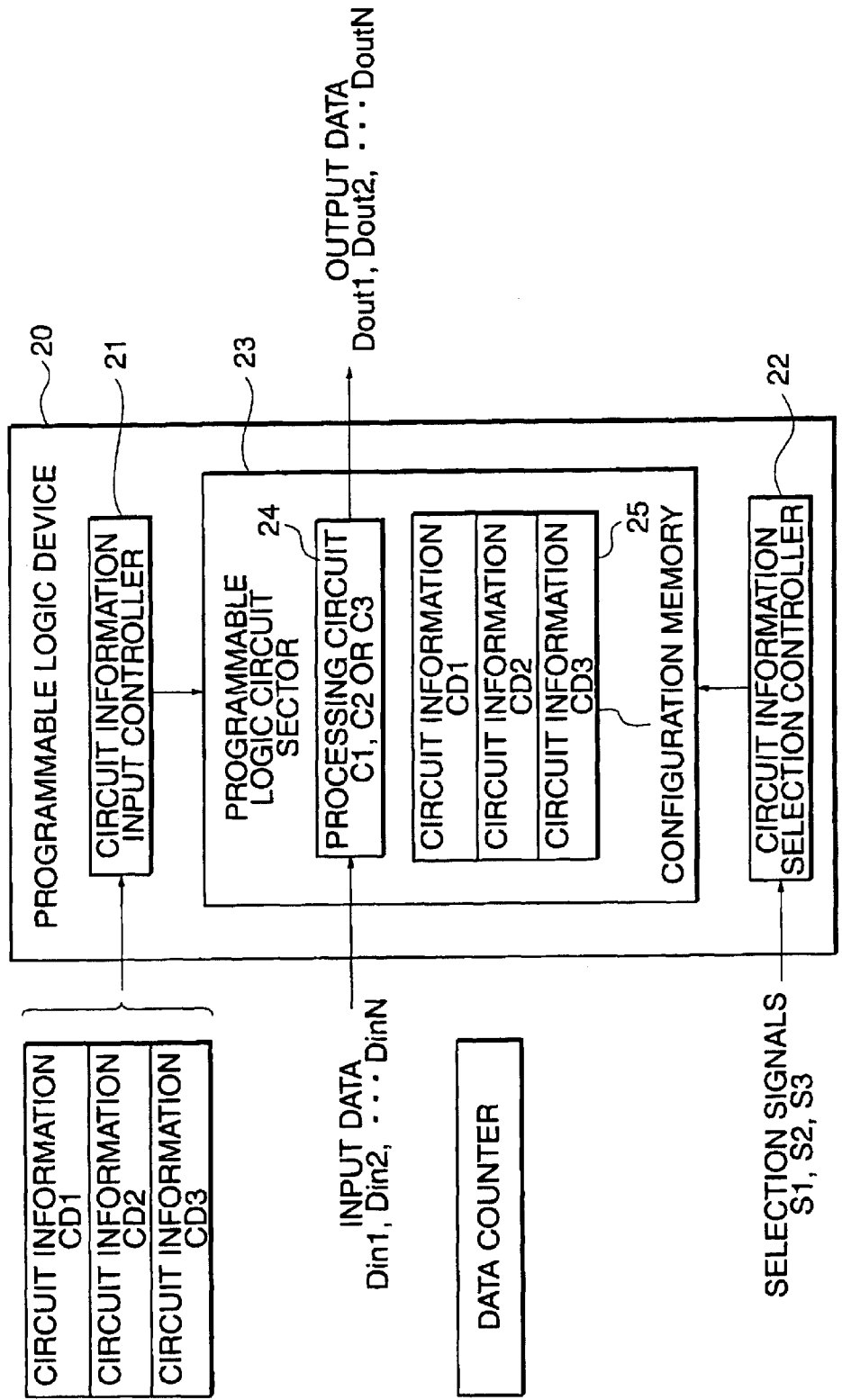

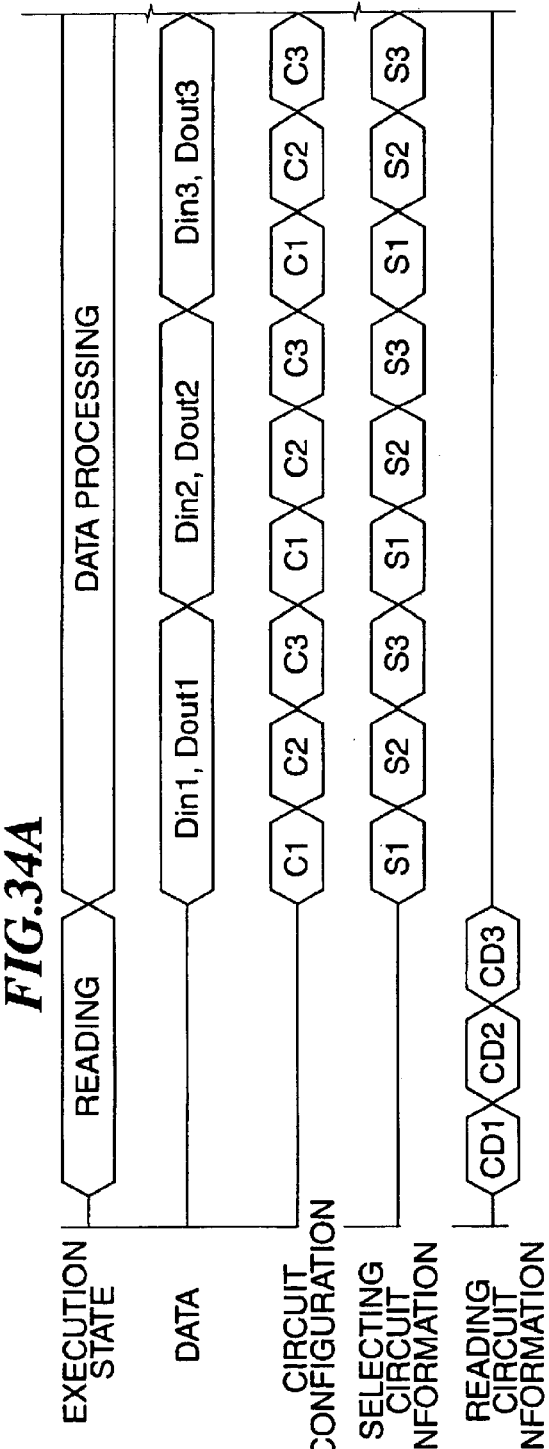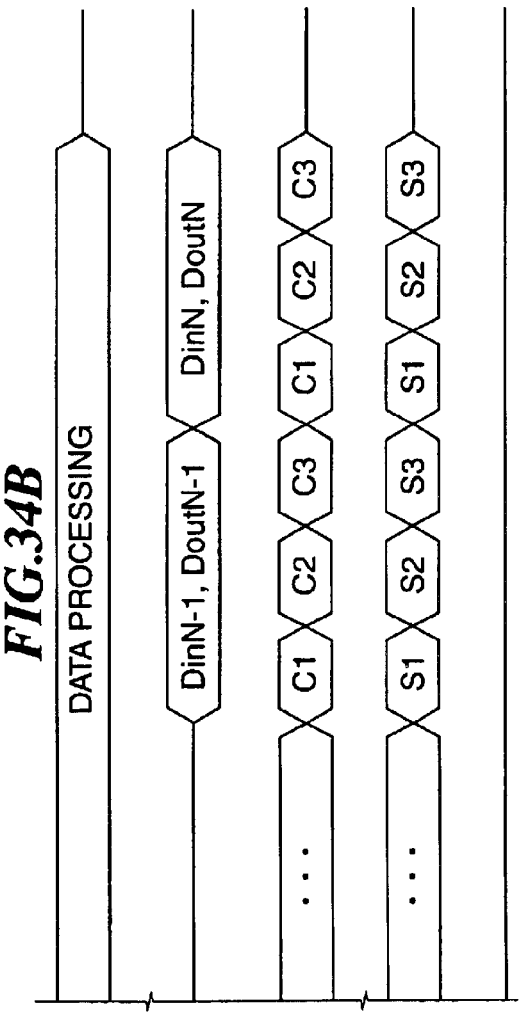

METHOD PROGRAMMABLE LOGIC DEVICE, INFORMATION PROCESSING SYSTEM AND METHOD OF RECONFIGURING CIRCUIT FOR SEQUENTIALLY PROCESSING DATA IN BLOCKS AND TEMPORARILY STORING DATA PROCESSED UNTIL NEXT CONFIGURATION

BACKGROUND OF THE INVENTION

1. Field of the Invention

The present invention relates to an information processing system that enables a part of processing by an application program for example to be processed using a programmable logic device of which the circuit can reconfigured, a data processing method in the information processing system and the programmable logic device used for the information processing system. Particularly, the present invention relates to a method of reducing processing time including time required for the reconfiguration of the programmable logic device.

2. Description of the Related Art

In the field of a digital device, a programmable logic device (PLD) such as a field programmable gate array (FPGA) has been used for a prototype device before an application specific integrated circuit (ASIC) is produced or for an alternative device of ASIC requiring a long production term of several weeks or months. Also, recently, a programmable logic device is used for changing specifications after a logic device is produced and enabling a circuit to be modified.

FIG. 17 shows the structure of a general programmable logic device. A programmable logic device 1 includes a circuit information input controller 2 that reads circuit information from an external device and a programmable logic circuit sector 3 that implements circuit functions according to read circuit information.

Further, the detailed structure of the programmable logic circuit sector 3 includes a circuit element 4 and a configuration memory 5 connected to the circuit element 4 as shown in FIG. 18. The circuit element 4 includes an I/O device, logic circuit cells and wiring, and the programmable logic device is classified into an FPGA type and a complex programmable logic device (CPLD) type depending upon the connection type of the circuit element 4.

For an FPGA-type programmable logic circuit sector 3A, as shown in FIG. 19A, logic circuit cells 6A arrayed in the shape of a cross grating are mutually connected via wiring 7A. Also, a signal is inputted/outputted from/to an external device via each I/O device 8A connected to the four sides of the rectangular wiring 7A as a whole.

Also, for a CPLD-type programmable logic circuit sector 3B, as shown in FIG. 19B, I/O devices 8B and logic circuit cells 6B are connected to wiring 7B in tree structure.

In both structures, circuit information read in the programmable logic device 1 is written to the configuration memory 5 by the circuit information input controller 2. According to the circuit information written to the configuration memory 5, the features and the connection state of the circuit element are determined. The operation is called reconfiguration or configuration of the programmable logic device.

In a conventional type programmable logic device, every time circuit information is read, data of the whole configuration memory is rewritten and the whole circuits configured in the programmable logic circuit sector are reconfigured.

Recently, reading only circuit information corresponding to a part of a configuration memory has been enabled. As a result, the change of a part of a circuit being operated in a programmable logic device and the addition of a new circuit to a programmable logic circuit sector without stopping the circuit being operated have been enabled. At this time, intermediate data being processed in the programmable logic device is not lost. Such a programmable logic device is called a programmable logic device that can be partially reconfigured dynamically.

-New Application of Programmable Logic Device-

As a digital communication network represented by the Internet is developed and popularized, the development and the standardization of a digital communication system and a digital media system configured on a network using it are rapidly progressing. A device that processes a digital signal on a network according to these systems can be roughly classified into two in view of the device that processes.

One is software processing that processes using a general purpose processor according to a procedure described in a program and the other is hardware processing that processes according to a procedure described in the form of the connection of circuits using a dedicated processing circuit such as ASIC.

Software processing has a characteristic that one processor can process data of plural systems and can correspond to a new system respectively by changing a program. On the other hand, as overhead for fetching an instruction from a memory storing a program and decoding it and for writing the result of an execution to the memory is required, software processing is slower in processing speed, compared with hardware processing operated at the same clock frequency. Also, there is a defect that as a main storage for storing a program and a secondary storage are required, a processor is large-sized.

In the meantime, hardware processing has a characteristic that the description of a processing procedure is realized by the connection of circuits, the overhead of processing is smaller compared with software processing operated at the same clock frequency, as a result, processing speed is faster and also, as a memory for storing a processing procedure is not required, a processor is small-sized. On the other hand, as the connection of circuits once produced cannot be varied, hardware processing is short of flexibility, compared with software processing, plural dedicated processing circuits are required to process data of plural systems and a circuit once produced cannot correspond to a new system.

Hardware processing using a programmable logic device to solve the defect described above that hardware processing is short of flexibility is recently attracting attention. That is, the hardware processing described above is the one that corresponds to plural systems and a new system by suitably changing the circuit information of a programmable logic device while keeping the characteristic of the hardware processing that processing speed is fast and a processor is small-sized.

As described above, technique that has similar flexibility to software processing using a general purpose processor by hardware processing by a programmable logic device and implements higher-speed processing than software processing is called reconfigurable computing.

-Description of Reconfigurable Computing Technique-

In reconfigurable computing, a required circuit is realized in a programmable logic device by storing the circuit information of plural processing circuits required for application processing in an external storage beforehand and writing the circuit information read from the external storage to a configuration memory in the programmable logic device if necessary.

The above technique is also called cache logic technique from a viewpoint of saving required circuit information outside a programmable logic device and is also called virtual logic technique from a viewpoint that a larger-scale circuit than the actual scale of a programmable logic circuit sector can be realized by rewriting circuit information. In the following description, these techniques are generically called cache logic technique for simplification.

The cache logic technique means time sharing driving technique for configuring a different circuit in the same programmable logic device if necessary. As a result, a larger-scale circuit can be realized using a programmable logic device having a smaller-scale circuit, and the miniaturization and the reduction of the cost of the device are enabled.

For an example of reconfigurable computing technique, there is "Reconfigurable network computing" disclosed in Japanese Published Unexamined Patent Application No. Hei 10-78932 and it will be described below as a conventional type example 1 referring to FIG. 20.

An information processing system in the conventional type example 1 includes plural computers connected to a communication network NET, at least one of them is a computer (an application server) SB that distributes an application program and the rest includes computers (client computers) CL to be a client computer into which the application program is downloaded and which executes the downloaded application program. Extended hardware 11 of which the features can be varied by a program at any time and which can be reconfigured is mounted in a part of the plural client computers CL.

A program code (an extension code) of a part of program features executed by the extended hardware and a main processor code of a part of the program features executed by a main processor 12 of a client computer CL are included in an application program AP stored in the application server SB.

The operating system (OS) of a client computer CL is provided with a feature to judge whether the extended hardware 11 is mounted or not and is provided with a code selection function 13 to fetch a code suitable for hardware configuration from an application program AP based upon the judgment. In case the extended hardware 11 is mounted as in the upper client computer CL shown in FIG. 20, an extension code is fetched from an application program AP using the code selection function 13 and processing is executed by the extended hardware.

Also, in case the extended hardware 11 is not mounted as in the lower client computer CL shown in FIG. 20, a main processor code is fetched from an application program AP using the code selection function 13 and processing is executed by the main processor 12.

According to the conventional type example 1 described above, when an application program distributed from the server is run on the side of a client computer connected via the network, the application program can be processed at high speed by mounting the extended hardware of which the features can be changed by a program at any time and which can be reconfigured on the side of the client computer, including the main processor code of the client computer and an extension code in the application program stored in the server, changing the configuration of the client computer using the code selection function for judging whether the extended hardware is mounted or not and the type of the extended hardware and configuring so that the configuration is suitable for the processing.

However, in the case of the conventional type example 1, there is a problem that time for writing circuit information to a configuration memory of the programmable logic device of the client computer CL from the application server SB is long depending upon the scale of the circuit information (an extension code) to be written to the configuration memory of the programmable logic device and even if high-speed processing is implemented using the extended hardware which is a dedicated hardware processing circuit, the whole processing time including circuit reconfiguration time is longer than processing time by software.

One possible solution of this problem is device technique called multicontext technique. That is, in multicontext technique, a circuit is reconfigured in a programmable logic device by providing plural configuration memories so that plural circuit information can be stored in the programmable logic device and switching the configuration memories if necessary, and circuit reconfiguration time is greatly reduced.

-Description of Programmable Logic Device Based Upon Multicontext Technique-

FIG. 21 shows the structure of a programmable logic device based upon multicontext technique. The programmable logic device 20 based upon multicontext technique includes a circuit information input controller 21 that reads plural circuit information pieces from an external device, a circuit information selection controller 22 that selects required circuit information of the plural circuit information pieces and a programmable logic circuit sector 23 that realizes a circuit function according to the selected circuit information.

The detailed structure of the programmable logic circuit sector 23 based upon multicontext technique is shown in FIG. 22 and the programmable logic circuit sector 23 includes an IO device, logic circuit cells, a circuit element 24 including wiring and a configuration memory 25 connected to the circuit element 24 as in the case described above. The configuration memory 25 in the case of the programmable logic circuit sector 23 based upon multicontext technique includes plural memory planes.

In the case of the programmable logic circuit sector 23 based upon multicontext technique, in both structures of the FPGA type and the CPLD type (see FIG. 19), plural circuit information pieces read in the programmable logic device 20 from an external device are written in a state that one circuit information piece is written to each memory plane of the configuration memory 25 by the circuit information input controller 21.

Of plural circuit information pieces written to plural memory planes of the configuration memory 25, the function of the circuit element 24 and a connection state are determined according to circuit information written to a memory plane selected according to a selection signal from the circuit information selection controller 22 and a circuit is reconfigured in the programmable logic device 20.

For an example of multicontext technique, there is "A Time-Multiplexed FPGA" announced at FPGAs for Custom Computing Machines in 1997 (FCCM'97). Referring to FIG. 23, the example described above will be described below as a conventional type example 2.

FIG. 23 shows the configuration of the announced time sharing driven FPGA. The time sharing driven FPGA is an improved product of XC4000E manufactured by Xilinx in the U.S. and is provided with eight sets of configuration memories including SRAM data which determines the logic cells and internal wiring of a circuit element 31. Circuit information corresponding to different circuit configuration is stored in each of the configuration memories 32 and a circuit of FPGA can be reconfigured by time sharing by switching these configuration memories 32.

As shown in the conventional type example 2, as in multicontext technique, plural circuit information pieces are stored in the configuration memories beforehand, circuit reconfiguration time can be reduced.

However, as plural planes or plural configuration memories are required inside the programmable logic device to store circuit information, the scale of the programmable logic circuit sector is enlarged. As the load capacity of the circuit element is increased when the scale of the circuit is enlarged, a problem is caused that the performance of the circuit is deteriorated and the power consumption is increased. Also, when the scale of the circuit is enlarged, a problem is caused that the manufacturing cost of the programmable logic device is increased.

In an information processing system for processing image data and others, image data is often sequentially processed in units of block including the predetermined number of groups of pixel data by plural processing circuits. For example, in case image compression coding processing is executed, image data is divided into blocks, orthogonal transformation is applied to data divided into a block in an orthogonal transformation circuit for example, quantization processing is applied to data after the orthogonal transformation in a quantizing circuit and further, variable-length coding processing is executed in a variable-length coding (an entropy coding) circuit.

In this case, generally, image data is sequentially supplied to plural processing circuits per block, in each processing circuit, processing is executed in units of block and an output signal per block is acquired. The processing is repeated by the number of blocks.

Therefore, in case processing by plural circuits is executed in the programmable logic device using cache logic technique and multicontext technique, it is general to sequentially reconfigure a processing circuit such as an orthogonal transformation circuit, a quantizing circuit and a variable-length coding circuit in the programmable logic circuit sector per data pieces in units of block and to execute processing independent of the programmable logic device in which a conventional type example is used.

However, in this method, the frequency of the reconfiguration of a circuit in the programmable logic circuit sector is required by the number of blocks to be processed, circuit configuration time has an effect upon the whole processing time, the whole processing time is extended and processing time may be longer than that of software processing in comparison in total processing time including circuit reconfiguration time.

Referring to drawings, processing time described above using the conventional type programmable logic device will be further detailedly described below.

Processing time will be described below using an application including three processing circuits C1, C2 and C3 as an example. Data to be processed includes N blocks (N: an integer which is two or more) and processing is completed by sequentially processing the data by the processing circuits C1, C2 and C3.

In case the application is the JPEG compression of an image for example, the processing circuits C1, C2 and C3 respectively correspond to a DCT circuit, a quantizing circuit and an entropy coding circuit and one block of data corresponds to 64 (8×8) pieces of pixel data in gradation that one pixel is represented by eight bits.

-Reconfiguration of Circuit Based Upon Conventional Type Cache Logic Technique-

As described referring to FIG. 17, the programmable logic device 1 in this case includes the circuit information input controller 2 and the programmable logic circuit sector 3 having the circuit element 4 and the configuration memory 5.

In this example, as shown in FIG. 24, circuit information CD1, CD2 and CD3 for respectively configuring circuits C1, C2 and C3 are sequentially read in the configuration memory 5 of the programmable logic circuit sector 3 via the circuit information input controller 2, processing circuits C1, C2 and C3 are configured in the part of the circuit element 4, the configured processing circuits C1, C2 and C3 respectively sequentially process N blocks of input data Din1, Din2, - - -, DinN and acquire N blocks of output data Duot1, Dout2, - - -, DoutN.

The processing procedure will be detailedly described below using a timing chart shown in FIG. 25 and a flowchart shown in FIG. 26.

As shown in FIG. 26, when processing is started, a value of a data counter that indicates the block number of input data is reset to 1 by an application controller not shown in FIG. 24 (a step S101).

Next, circuit information CD1 is read in the configuration memory 5 via the circuit information input controller 2 and a processing circuit C1 is configured in the programmable logic circuit sector 3 (a step S102). This is equivalent to a reading execution state shown as first "reading" in the timing chart shown in FIG. 25.

When the processing circuit C1 is configured, a block Din1 indicated by the data counter of input data is input to the processing circuit C1 (a step S103). When the data is input, a value of the data counter is incremented by one by the application controller (a step S104). The input data Din1 is processed in the processing circuit C1 (a step S105). The operation from the input of data to processing by the processing circuit C1 is equivalent to a data processing execution state shown as first "processing" in the timing chart shown in FIG. 25.

The processing circuit C1 configured based upon the circuit information CD1 includes an input data buffer 42 and a processing execution circuit 41 as shown in FIG. 27. The input data Din1 is temporarily stored in the input data buffer 42 and is sequentially processed in the processing execution circuit 41. The result of the processing is stored in the input data buffer 42 as intermediate data again. At this time, the first input data Din1 is overwritten by intermediate data and lost.

As described above, circuit information CD2 is read in the configuration memory 5 via the circuit information input controller 2 in a state in which the intermediate data acquired by processing the input data Din1 in the processing circuit C1 is stored in the input data buffer 42 in the programmable logic circuit sector 3 and a processing circuit C2 is configured in the programmable logic circuit sector 3 (a step S106). This is equivalent to a reading state shown as second "reading" in the timing chart shown in FIG. 25.

When the processing circuit C2 is configured, the intermediate data stored in the programmable logic circuit sector 3 is input to the processing circuit C2 and processed (a step S107). The operation from the input of the intermediate data to processing by the processing circuit C2 is equivalent to a data processing execution state shown as second "processing" in the timing chart shown in FIG. 25.

In this case, as shown in FIG. 28, the circuit information CD2 dynamically partially reconfigures the processing execution circuit 41 of the processing circuit C1 to be a processing execution circuit 43 with the input data buffer 42 included and configures the processing circuit C2. As a result, intermediate data is stored in the input data buffer 42 to be input data to the processing circuit C2. The result of processing by the processing execution circuit 43 is stored in the input data buffer 42 as new intermediate data again. At this time, the first intermediate data is overwritten by the new intermediate data and lost.

Circuit information CD3 is read in the configuration memory 5 via the circuit information input controller 2 in a state in which the result of the processing in the processing circuit C2 is stored in the programmable logic circuit sector 3 as the new intermediate data and a processing circuit C3 is configured in the programmable logic circuit sector 3 (a step S108). This is equivalent to a reading state shown as third "reading" in the timing chart shown in FIG. 25.

When the processing circuit C3 is configured, the intermediate data stored in the input data buffer 42 in the programmable logic circuit sector 3 is input to the processing circuit C3, is processed (a step S109) and the result of the processing is output as output data Dout1 (a step S110). The operation from the input of the intermediate data to the result of the processing by the processing circuit C3 is equivalent to a data processing execution state shown as third "processing" in the timing chart shown in FIG. 25.

In this case, as shown in FIG. 29, the circuit information CD3 dynamically partially reconfigures the processing execution circuit 43 of the processing circuit C2 to be a processing execution circuit 44 with the input data buffer 42 included, further adds an output data buffer 45 and configures the processing circuit C3. As a result, intermediate data is stored in the input data buffer 42 to be input data to the processing circuit C3. After the result of processing by the processing execution circuit 44 is temporarily stored in the output data buffer 45, it is output as output data.

In case a value of the data counter is smaller than the number N of all blocks of input data when the result of the processing by the processing circuit C3 is output, a processing cycle in the steps described above S102 to S110 since circuit information CD1 is read again until the processing of all input data is finished is repeated (a step S111).

As described above, one block of data is processed by reading circuit information three times and the succeeding data processing. All input data is processed by repeating this cycle by the number N of blocks of the input data.

In case an error occurs in reading circuit information and in processing in the processing circuit though the case is not shown in FIGS. 25 and 26, the occurrence of the error is informed to the application controller and processing is terminated.

In the example described above, the circuit information CD1 generates the input data buffer, the circuit information CD3 generates the output data buffer and they store the intermediate data generated by each processing circuit C1, C2, C3, however, the invention is not limited to the case described above. FIGS. 30, 31 and 32 respectively show examples of another circuit configuration.

In another example, a processing circuit C1 configured by circuit information CD1 includes a processing execution circuit 41, a left data buffer 42L and a right data buffer 42R as shown in FIG. 30. Input data is temporarily stored in the left data buffer 42L and is sequentially processed in the processing execution circuit 41. The result of the processing is stored in the right data buffer 42R as intermediate data. At this time, the first input data remains stored in the left data buffer 42L.

Circuit information CD2 dynamically partially reconfigures the processing execution circuit 41 of the processing circuit C1 to be the processing execution circuit 43 with the left data buffer 42L and the right data buffer 42R included and configures a processing circuit C2 as shown in FIG. 31. At this time, unlike the processing execution circuit 41, data is input from the right data buffer 42R to the processing execution circuit 43 and is output from the processing execution circuit 43 to the left data buffer 42L. As a result, intermediate data stored in the right data buffer 42R is input to the processing execution circuit 43. The result of processing by the processing execution circuit 43 is stored in the left data buffer 42L as new intermediate data. At this time, the first input data stored in the left data buffer 42L is overwritten by the new intermediate data and lost.

Circuit information CD3 dynamically partially reconfigures the processing execution circuit 43 of the processing circuit C2 to be the processing execution circuit 44 with the left data buffer 42L and the right data buffer 42R included and configures a processing circuit C3 as shown in FIG. 32. At this time, as in the processing execution circuit 41, data is input from the left data buffer 42L to the processing execution circuit 44 and is output from the processing execution circuit 44 to the right data buffer 42R. As a result, intermediate data stored in the left data buffer 42L is input to the processing execution circuit 44. After the result of processing by the processing execution circuit 44 is temporarily stored in the right data buffer 42R, it is output as output data.

-Reconfiguration of Circuit in Reconfigurable Computing Using Multicontext Technique- As described referring to FIG. 21, the programmable logic device based upon multicontext technique includes the circuit information input controller 21 that reads plural circuit information pieces from an external device, the circuit information selection controller 22 that selects required circuit information of the plural circuit information pieces and the programmable logic circuit sector 23 that realizes a circuit function based upon the selected circuit information pieces.

For an example of an application of the programmable logic device based upon multicontext technique, as shown in FIG. 33, circuit information pieces CD1, CD2 and CD3 are sequentially read and stored in the configuration memory 25 of the programmable logic circuit sector 23 via the circuit information input controller 21.

N blocks of input data Din1, Din2, - - -, DinN are sequentially processed in processing circuits C1, C2 and C3 respectively configured by the circuit information selection controller 22 according to selection signals S1, S2 and S3 and output data for N blocks Dout1, Dout2, - - -, DoutN are acquired.

The processing procedure will be detailedly described below using a timing chart shown in FIG. 34 and a flowchart shown in FIG. 35.

As shown in FIG. 35, when processing is started, a value of a data counter that indicates the block number of input data is reset to 1 by an application controller not shown in FIG. 33 (a step S201).

Next, three circuit information CD1, CD2 and CD3 are sequentially read via the circuit information input controller 21 and are sequentially stored in the configuration memory 25 (steps S202, S203 and S204). This is equivalent to a reading execution state shown as "reading" in the timing chart shown in FIG. 34.

Next, according to a selection signal S1, a processing circuit C1 is configured according to a direction from the circuit information selection controller 22 (a step S205) and the block Din1 indicated by the data counter of input data is input to the processing circuit C1 (a step S206). When the data is input, a value of the data counter is incremented by one by the application controller (a step S207). The input data Din1 is processed in the processing circuit C1 (a step S208).

Next, a processing circuit C2 is configured in the programmable logic circuit sector 23 according to a direction from the circuit information selection controller 22 according to a selection signal S2 in a state in which intermediate data acquired by processing the input data Din1 in the processing circuit C1 is stored in the programmable logic circuit sector 23 (a step S209). When the processing circuit C2 is configured, the intermediate data stored in the programmable logic circuit sector 23 is input to the processing circuit C2 and processed (a step S210).

A processing circuit C3 is configured in the programmable logic circuit sector 23 according to a direction from the circuit information selection controller 22 according to a selection signal S3 in a state in which the result of the processing of the intermediate data in the processing circuit C2 is stored in the programmable logic circuit sector 23 as new intermediate data (a step S211). When the processing circuit C3 is configured, the intermediate data stored in the programmable logic circuit sector 23 is input to the processing circuit C3 and processed (a step S212). The result of the processing is output as output data Duot1 (a step S213).

In case a value of the data counter is smaller than the number N of all blocks of input data when the result of the processing by the processing circuit C3 is output, a processing cycle from the step S205 to the step S213 is repeated with a processing circuit C1 selected again according to a selection signal S1 until the end of the processing of all input data (a step S214).

As described above, one block of data is processed by selecting circuit information three times according to a selection signal and the succeeding data processing. All input data is processed by repeating this cycle by the number N of blocks of the input data.

In case an error occurs in reading circuit information and in processing in the processing circuit though the case is not shown in FIGS. 34 and 35, the occurrence of the error is informed the application controller and processing is terminated.

For the circuit configuration that the processing circuits C1, C2 and C3 store intermediate data in the description of this example, the same circuit configuration as the one described referring to FIGS. 27 to 29 and FIGS. 30 to 32 can be used.

As described above, in the case of a reconfiguration method using the conventional type programmable logic device, plural circuits are required to be sequentially repeatedly reconfigured per block, the frequency of reconfiguration is required by (the number of blocks×the number of circuits) and therefore, there is a problem that total processing time is long.

SUMMARY OF THE INVENTION

The present invention has been made in view of the above circumstances and provides a method of implementing cache logic technique based upon which total processing time can be reduced without using a configuration memory that stores plural circuit information pieces and causes the deterioration of the performance of a circuit, the increase of the power consumption, the increase of the manufacturing cost and others as in multicontext technique, as well as in the case where plural processing in units of block are repeatedly executed.

To overcome the above problems, a data processing method, by a programmable logic device, is provided for sequentially processing input data divided into blocks in units of the blocks in plural circuits using the programmable logic device which includes a programmable logic circuit sector and a data cache. The programmable logic circuit sector is provided with a circuit element and a configuration memory connected to the circuit element, and is configured using the circuit element based upon circuit information written to the configuration memory. The data cache temporarily stores data processed in the circuit configured based upon the circuit information. The data processing method includes the steps of: performing first configuration in which circuit information of a first circuit among the plural circuits is written to the configuration memory and the first circuit is configured in the programmable logic circuit; performing first processing in which plural blocks which can be stored in the data cache of the input data are processed in the first circuit and data in units of block of the result of the processing is stored in the data cache; performing next configuration in which, after the result of the processing for the plural blocks of the input data is stored in the data cache, circuit information of a next circuit among the plural circuits is written to the configuration memory and the next circuit is configured in the programmable logic circuit; performing next processing in which data of the result of the processing for the plural blocks stored in the data cache is processed in the circuit configured in the next configuration and data for plural blocks of the result of the processing is stored in the data cache; and performing output processing in which the next configuration and the next processing are repeated to the last circuit of the plural circuits and the result of the processing in the last circuit is outputted to an external device as output data. The operation from the first configuration to the output processing is executed for the whole input data per unit of the plural blocks of the input data.

In the data processing method by the programmable logic device according to the invention configured as described above, plural circuits are not sequentially reconfigured per block of input in the programmable logic device to execute processing but plural circuits are sequentially reconfigured in the programmable logic device per plural blocks which can be stored in the data cache provided to the programmable logic device to execute processing.

That is, in a circuit to be reconfigured in the programmable logic device, data is processed in units of block, however, when the processing of one block of input data is finished, the next circuit is not reconfigured but the processing of plural blocks is executed in the same circuit so that one block of data of the result of processing is stored in the data cache, the processing of the next one block of data is executed in the same circuit and the result of the processing is succeedingly stored in the data cache and intermediate data of the result of the processing is stored in the data cache.

When the processing of the number of blocks which can be stored in the data cache is finished in the first circuit, a second circuit is reconfigured in the programmable logic device. Data input to the second circuit is intermediate data stored in the data cache.

In the second circuit, data processing is also executed in units of block, however, all intermediate data stored in the data cache is processed and the result of processing in the second circuit is sequentially stored in the data cache as intermediate data unless the second circuit is the last processing circuit. At this time, intermediate data stored in the data cache before is overwritten.

When the processing of intermediate data for plural blocks processed by the second circuit and stored in the data cache is finished, a third circuit is reconfigured next in the programmable logic device, as the time of the second circuit, data stored in the data cache as input data is processed in units of block and the result of the processing is stored in the data cache. The processing is repeated till the last circuit of the plural circuits.

In the case where a circuit configured in the programmable logic circuit is the last processing circuit, the result of processing is output as output data outside the programmable logic device without storing it in the data cache.

Data processing in units of plural blocks is executed for all input data.

Therefore, in the case of the data processing method according to the invention, as plural circuits are not reconfigured per block but plural circuits are reconfigured per plural blocks which can be stored in the data cache, the frequency of the reconfiguration of a circuit in the programmable logic device is reduced compared with the data processing method by the conventional type programmable logic device described above and total data processing time is reduced equivalently. If the number of blocks in a processing unit is K, the frequency of the reconfiguration of a circuit in the programmable logic device is reduced up to 1/K of the conventional type case described above.

BRIEF DESCRIPTION OF THE DRAWINGS

Preferred embodiments of the present invention will be described in detail based upon the followings, wherein:

FIG. 4 shows an example of the configuration in an embodiment of an information processing system according to the invention;

FIG. 5 is a timing chart used for explaining the operation in an embodiment of a data processing method according to the invention;

FIG. 10 is an explanatory drawing for explaining a concrete example of data processing to which the data processing method according to the invention is applied;

FIG. 11 shows comparison between the embodiment of the data processing method according to the invention and a conventional type example;

FIG. 12 shows comparison between the embodiment of the data processing method according to the invention and the conventional type example;

FIG. 25 is a timing chart for explaining the example shown in FIG. 24;

FIG. 33 is an explanatory drawing for explaining an example of data processing using multicontext technique;

FIG. 34 is a timing chart for explaining the example shown in FIG. 33; and

DETAILED DESCRIPTION OF THE PREFERRED EMBODIMENTS

Figure 1:
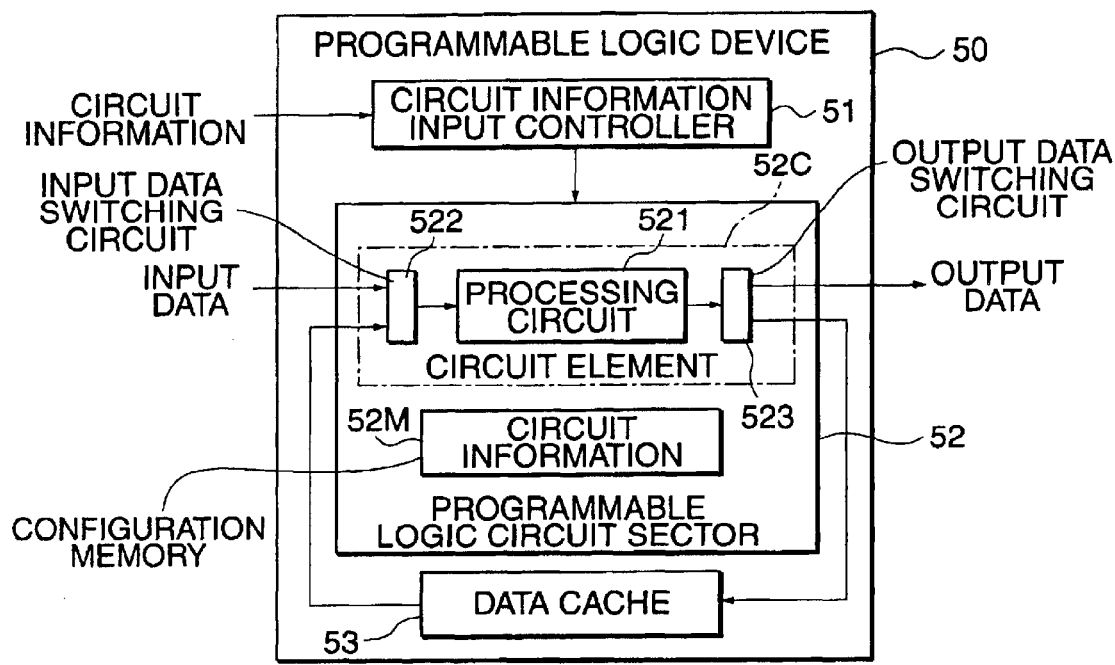
FIG. 1 shows a first structure in an embodiment of a programmable logic device according to the invention.

Referring to the drawings, embodiments of a data processing method by a programmable logic device according to the invention, an information processing system using it and the programmable logic device used for it will be described below.

-Description of Structure of Programmable Logic Device According to the Invention- First, an embodiment of the programmable logic device according to the invention will be described.

-First Structure-

FIG. 1 shows first structure (a first embodiment of a programmable logic device) of a programmable logic device according to the invention.

The programmable logic device 50 provided with the first structure includes a circuit information input controller 51 that reads circuit information from an external device, a programmable logic circuit sector 52 that implements a circuit feature according to the read circuit information and a data cache 53 that temporarily stores intermediate data being processed.

The programmable logic circuit sector 52 is provided with a circuit element 52C and a configuration memory 52M, and the features and the connection state of the circuit element 52C are determined based upon circuit information written from the circuit information input controller 51 to the configuration memory 52M.

In the first structure, a circuit configured based upon circuit information read in the configuration memory 52M is provided with, in addition to a target processing circuit, an input data switching circuit 522 that switches data from an external device to be input to a processing circuit 521 and data stored in the data cache 53 to be input to the processing circuit 521 and an output data switching circuit 523 that switches data from the processing circuit 521 to be output to an external device and data from the processing circuit 521 to be stored in the data cache 53.

In case input data divided into a block is sequentially processed by plural circuits in units of block using the programmable logic device 50, the input data switching circuit 522 and the output data switching circuit 523 are generated based upon the circuit information of a first circuit among the plural circuits.

In data processing in a first circuit in processing order of the plural circuits, the input data switching circuit 522 is switched so that it supplies data input from an external device to the processing circuit 521 and the output data switching circuit 523 is switched so that it supplies data output from the processing circuit 521 to the data cache 53.

Also, in data processing in an intermediate circuit in processing order of the plural circuits, the input data switching circuit 522 is switched so it inputs data from the data cache 53 to the processing circuit 521 and the output data switching circuit 523 is switched so that it supplies data output from the processing circuit 521 to the data cache 53.

Also, in data processing in the last circuit in processing order of the plural circuits, the input data switching circuit 522 is switched so that it inputs data from the data cache 53 to the processing circuit 521 and the output data switching circuit 523 is switched so that it outputs data output from the processing circuit 521 to an external device.

Control over respectively switching the input data switching circuit 522 and the output data switching circuit 523 is executed by an application controller that controls the flow of data processing as described later.

-Second Structure-

Figure 2:
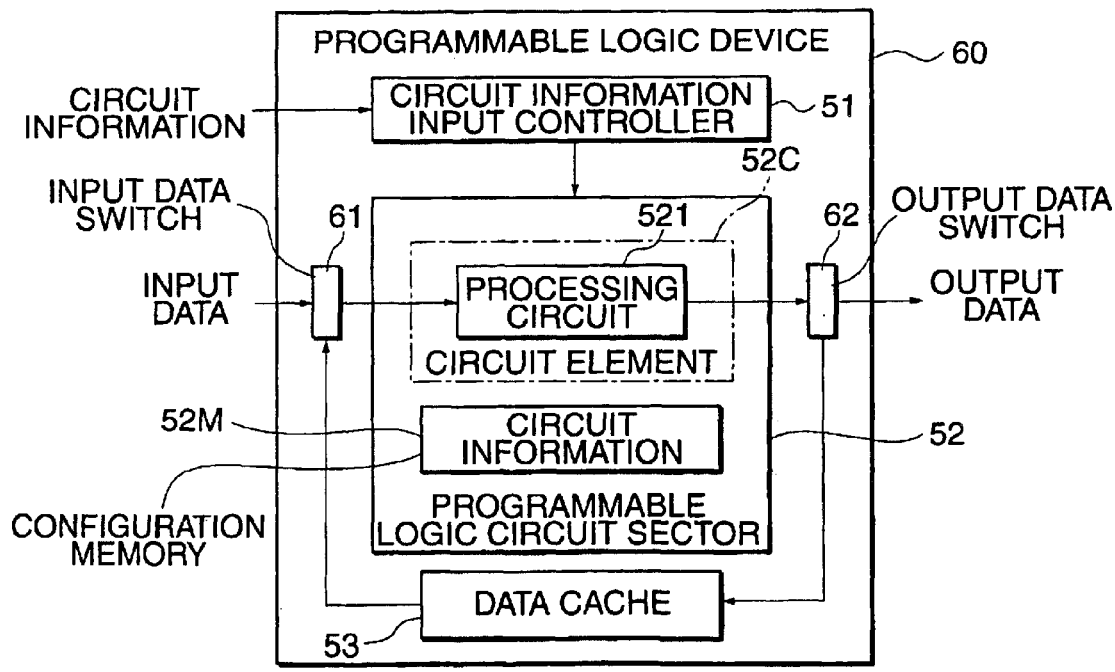
FIG. 2 shows a second structure in the embodiment of the programmable logic device according to the invention.

FIG. 2 shows a second structure (a second embodiment) of the programmable logic device according to the invention.

A programmable logic device 60 provided with the second structure includes a circuit information input controller 51 that reads circuit information from an external device, a programmable logic circuit sector 52 that implements circuit functions based upon the read circuit information, a data cache 53 that temporarily stores intermediate data being processed, an input data switch 61 that switches data input from an external device to be input to a processing circuit and data stored in the data cache 53 to be input to the processing circuit, and an output data switch 62 that switches data output from the processing circuit to be output to an external device and data output from the processing circuit to be stored in the data cache 53.

The difference between the programmable logic device 60 provided with the second structure and the programmable logic device 50 provided with the first structure is characterized in that the input data switch 61 and the output data switch 62 respectively provided with the same function as that of the input data switching circuit 522 and the output data switching circuit 523 respectively configured based upon circuit information in the programmable logic device 50 provided with the first structure are provided separately from the programmable logic circuit sector 52 in the programmable logic device 60 provided with the second structure.

In the case of the second structure, only the information of the processing circuit 521 is read in the configuration memory 52M.

As the input data switch 61 and the output data switch 62 are not configured based upon circuit information in case the programmable logic device 60 provided with the second structure is used, there is an advantage that the quantity of circuit information is relatively reduced, compared with that in the programmable logic device 50 provided with the first structure and time required for reconfiguration can be more reduced.

-Third Structure-

Figure 3:
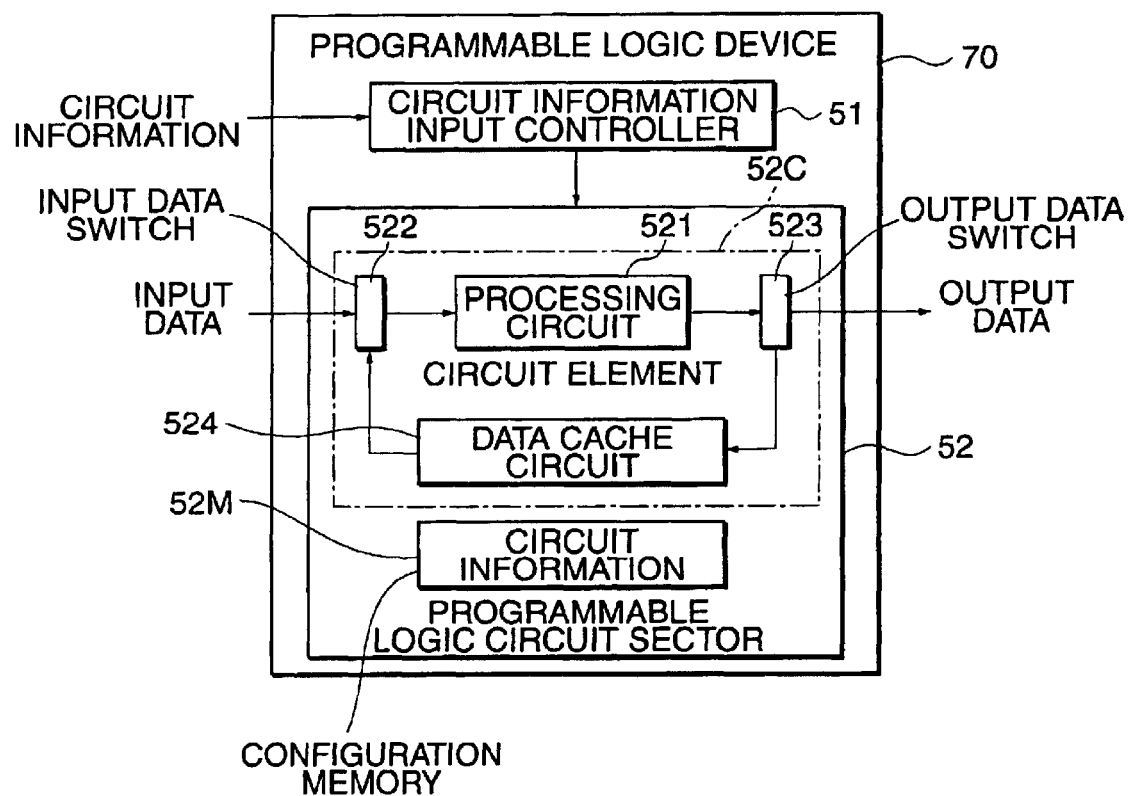
FIG. 3 shows a third structure in the embodiment of the programmable logic device according to the invention.

FIG. 3 shows a third structure (the third embodiment) of the programmable logic device according to the invention.

A programmable logic device 70 provided with the third structure includes a circuit information input controller 51 that reads circuit information from an external device and a programmable logic circuit sector 52 that realizes circuit functions based upon the read circuit information.

In the third structure, a circuit configured based upon circuit information read in a configuration memory 52M is provided with a processing circuit 521 which is the purpose of the circuit, a data cache 524, an input data switching circuit 522 that switches data input from an external device to be input to the processing circuit 521 and data stored in the data cache 524 to be input to the processing circuit 521 and an output data switching circuit 523 that switches data output from the processing circuit 521 to be output to an external device and data output from the processing circuit 521 to be stored in the data cache 524.

The difference between the programmable logic device 70 provided with the third structure and the programmable logic device 50 provided with the first structure is characterized in that the function of the data cache 53 in the first structure is implemented by a data cache circuit 524 configured based upon circuit information.

Figure 17:
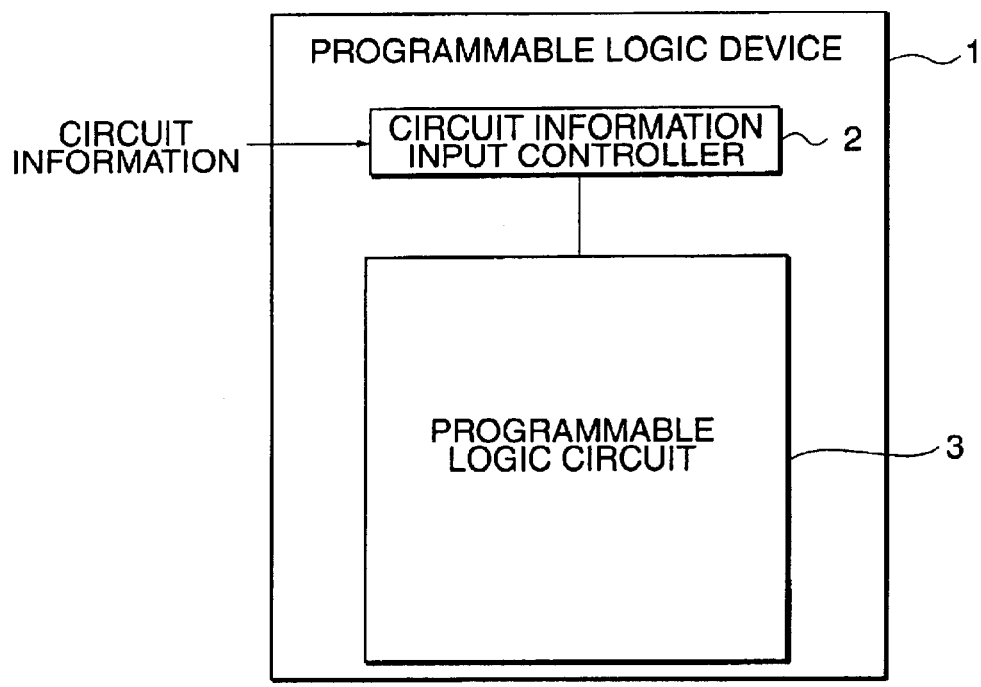
FIG. 17 shows an example of the structure of a general programmable logic device.
Figure 18:
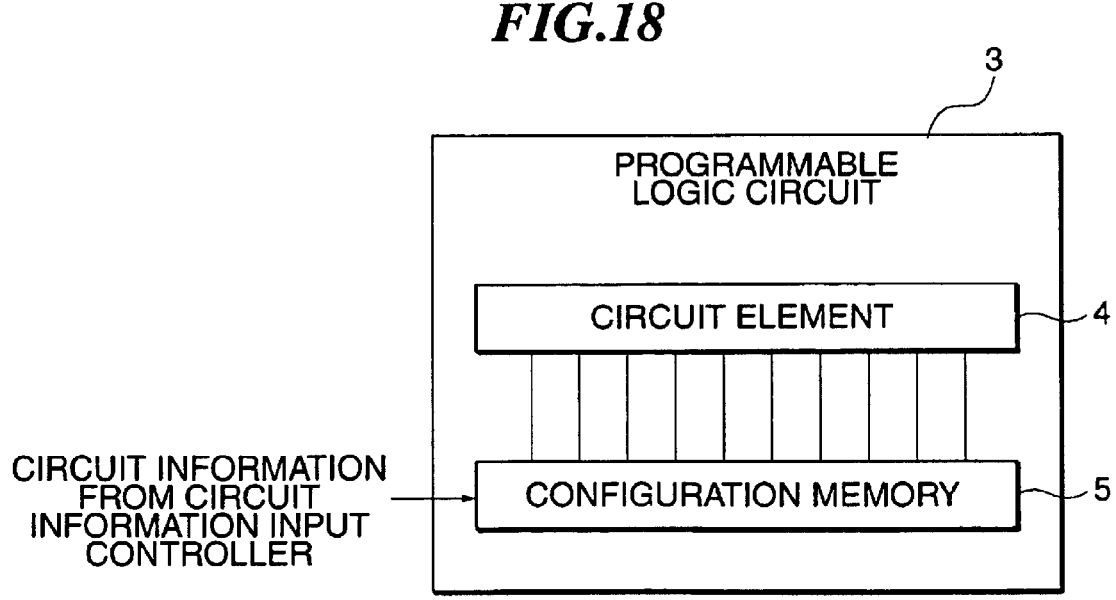
FIG. 18 is an explanatory drawing for explaining the detailed structure of a programmable logic circuit sector of the programmable logic device shown in FIG. 17.
Figure 19A:
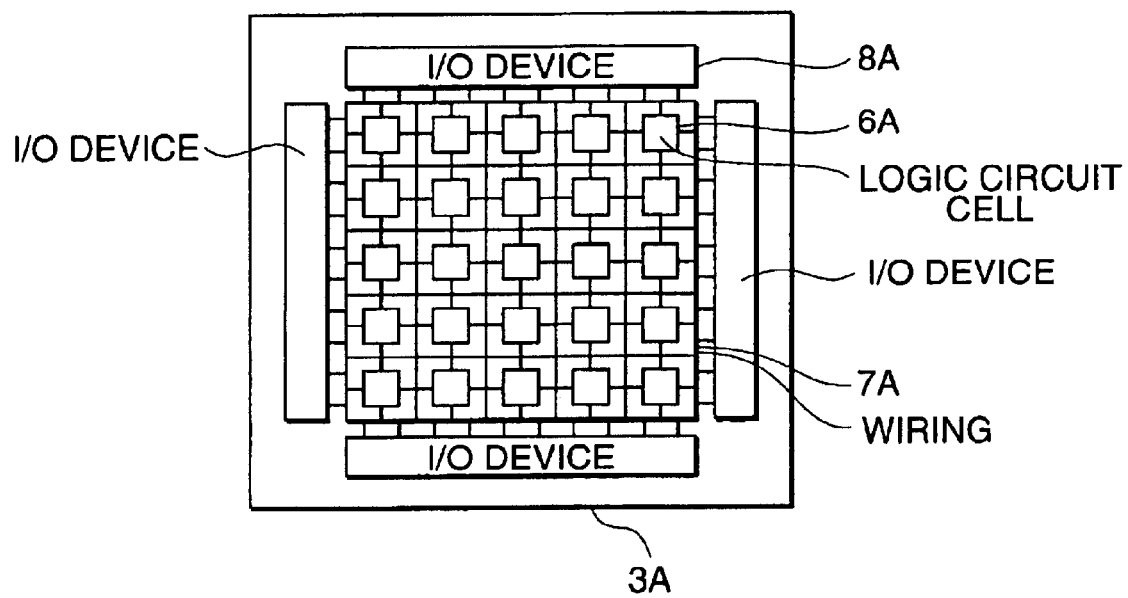
FIGS. 19A and 19B are explanatory drawings for explaining the detailed structure of the programmable logic circuit sector of the programmable logic device shown in FIG. 17.
Figure 19B:
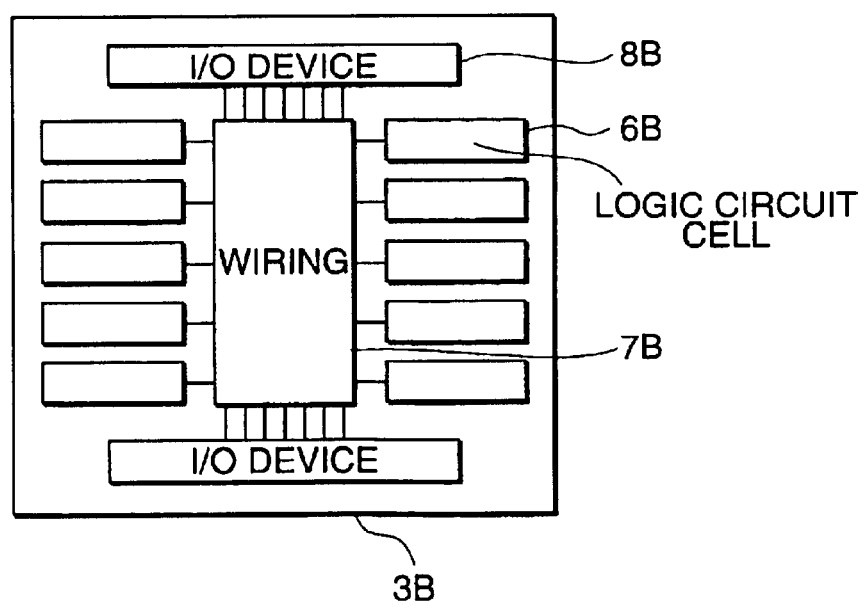
Figure 20:
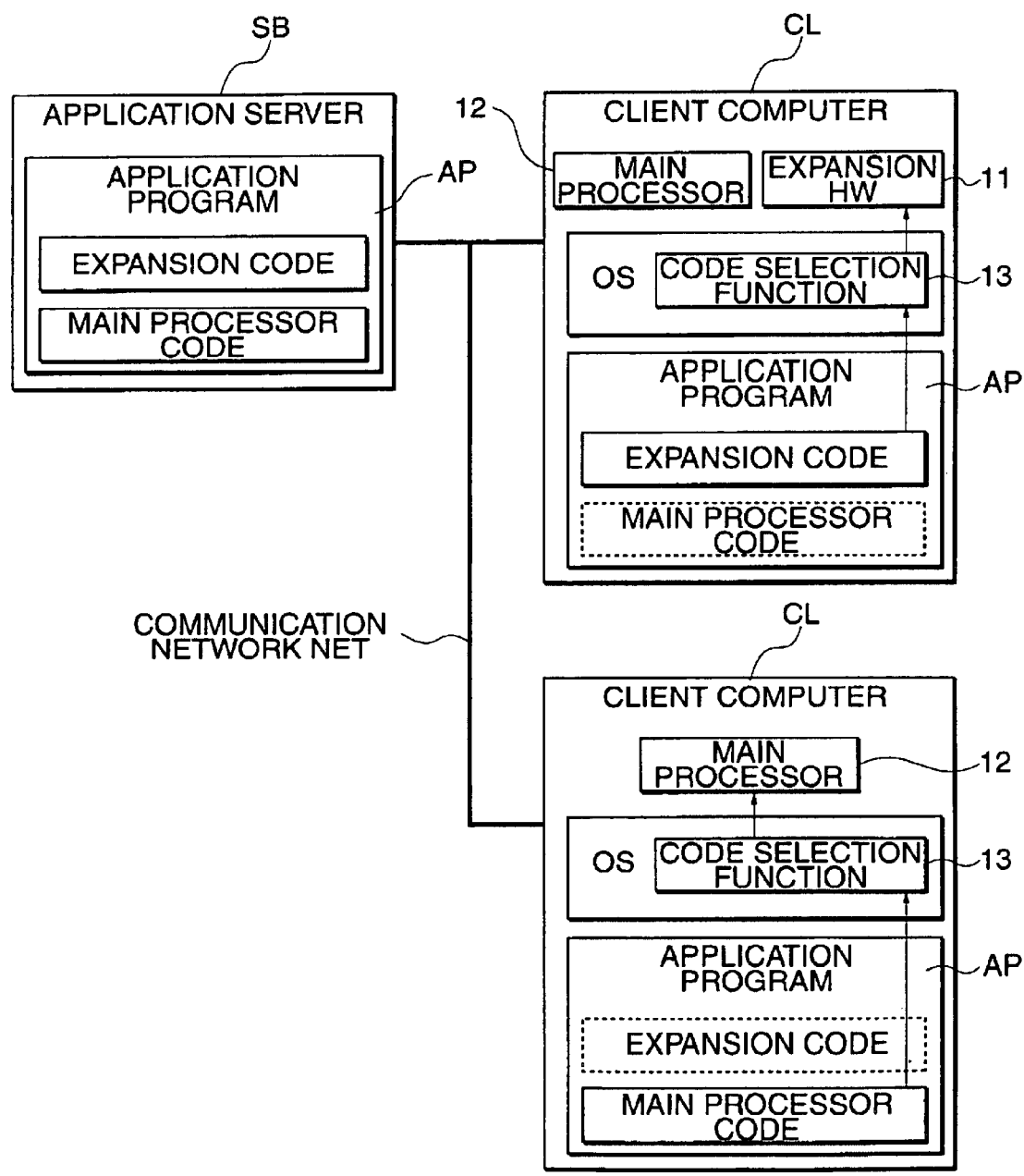
FIG. 20 shows an example of reconfigurable computing technique.
Figure 21:
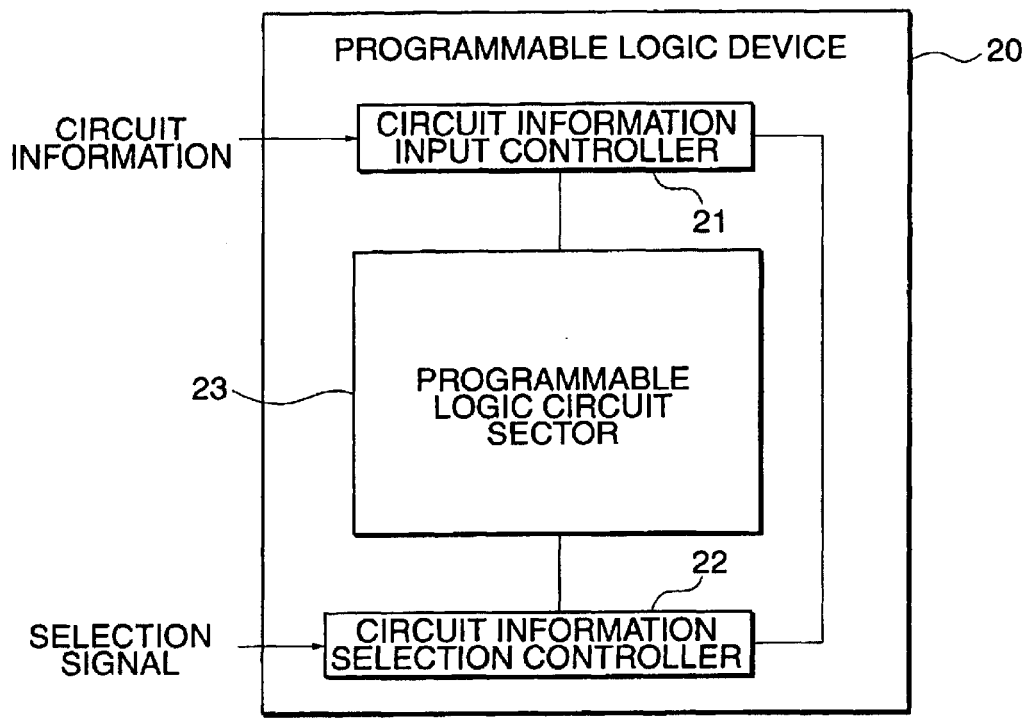
FIG. 21 is an explanatory drawing for explaining a programmable logic device used for multicontext technique.
Figure 22:
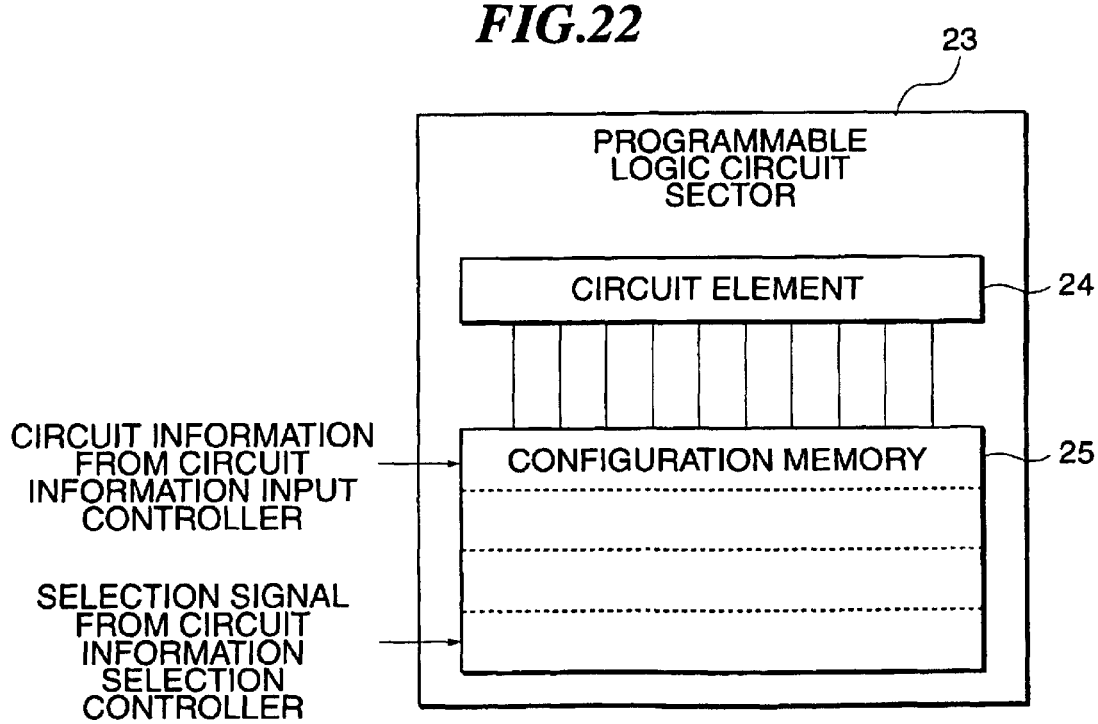
FIG. 22 shows the detailed configuration of a programmable logic circuit sector of the programmable logic device shown in FIG. 21.
Figure 23:
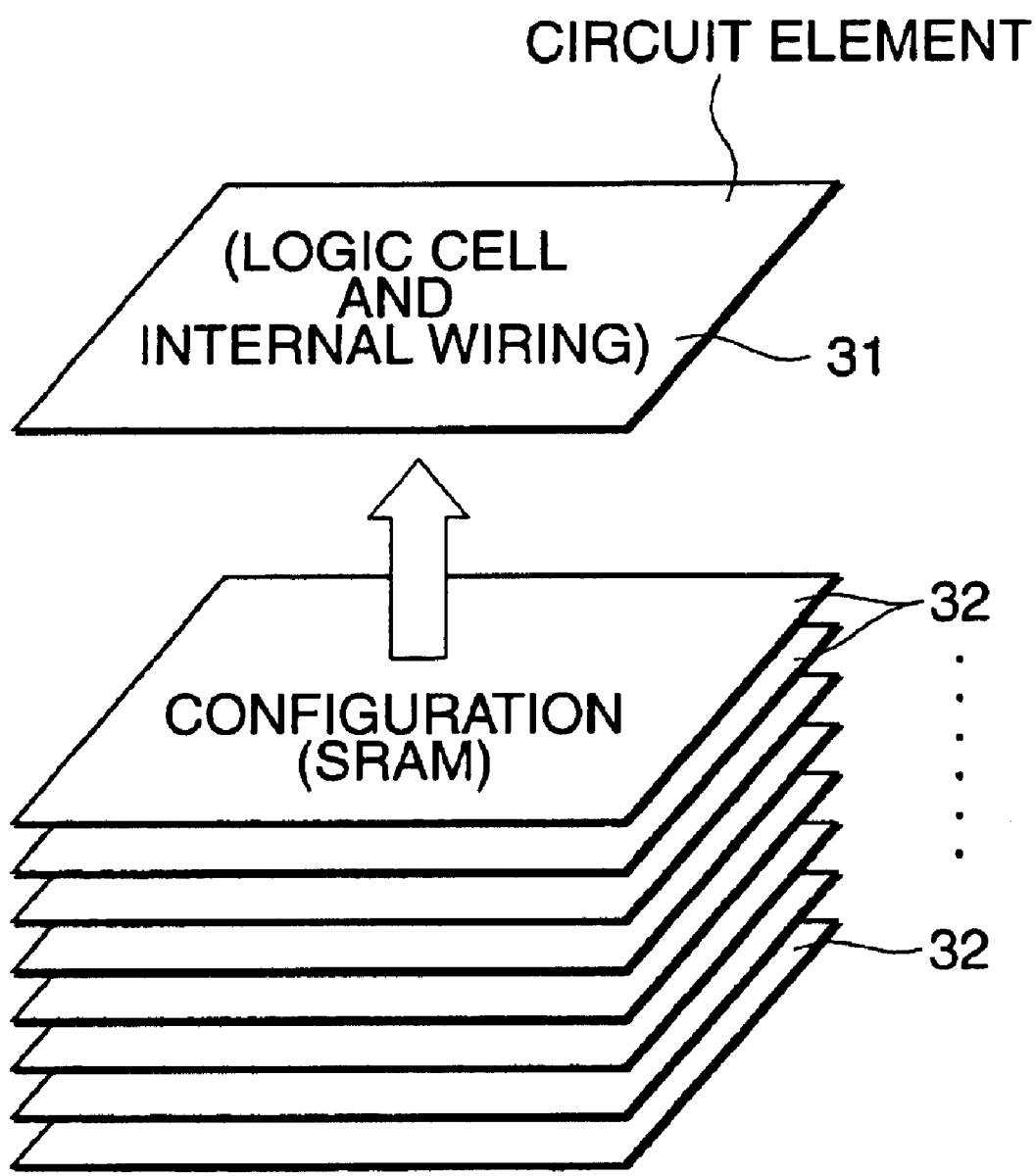
FIG. 23 is an explanatory drawing for explaining another example of the programmable logic device based upon multicontext technique.
Figure 24:
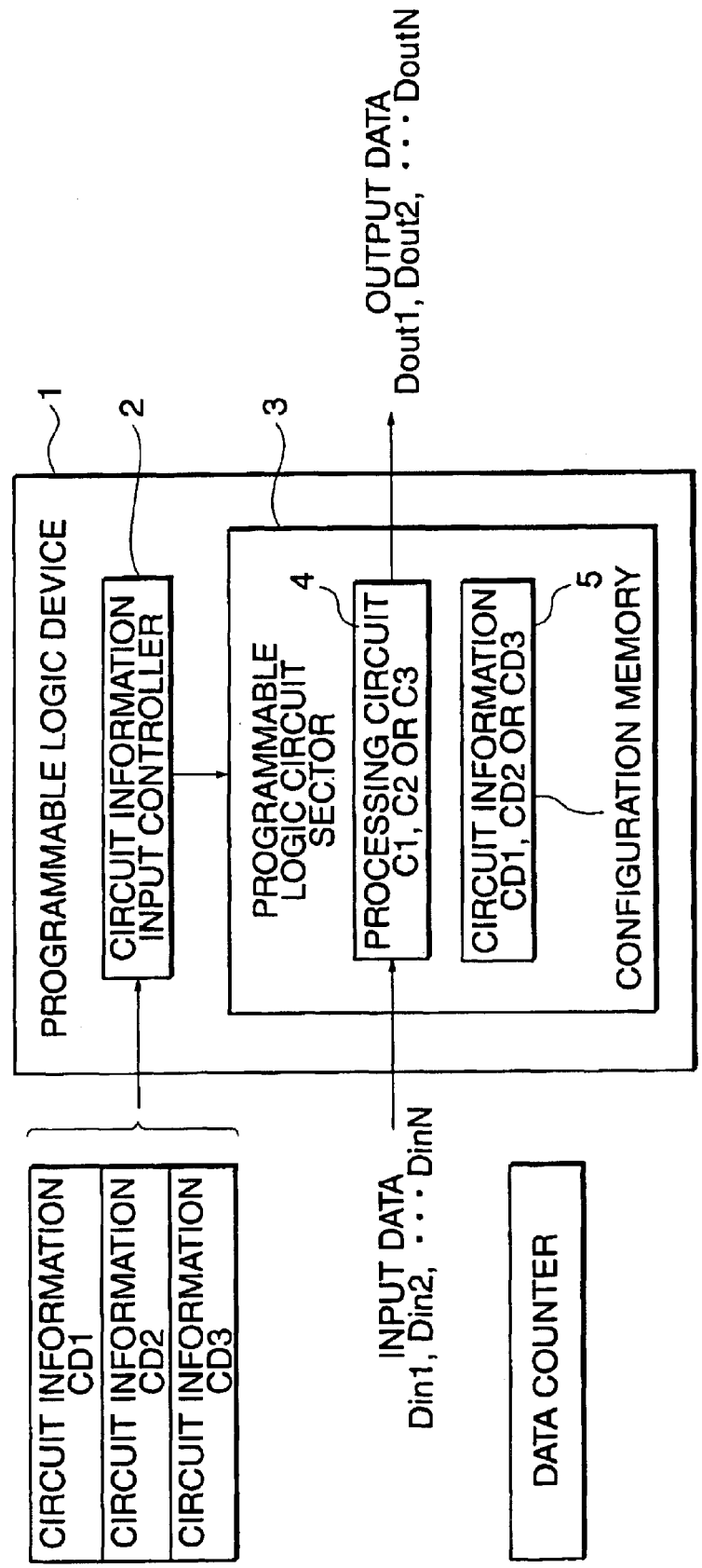
FIG. 24 is an explanatory drawing for explaining an example of data processing using conventional type reconfigurable computing.
Figure 26:
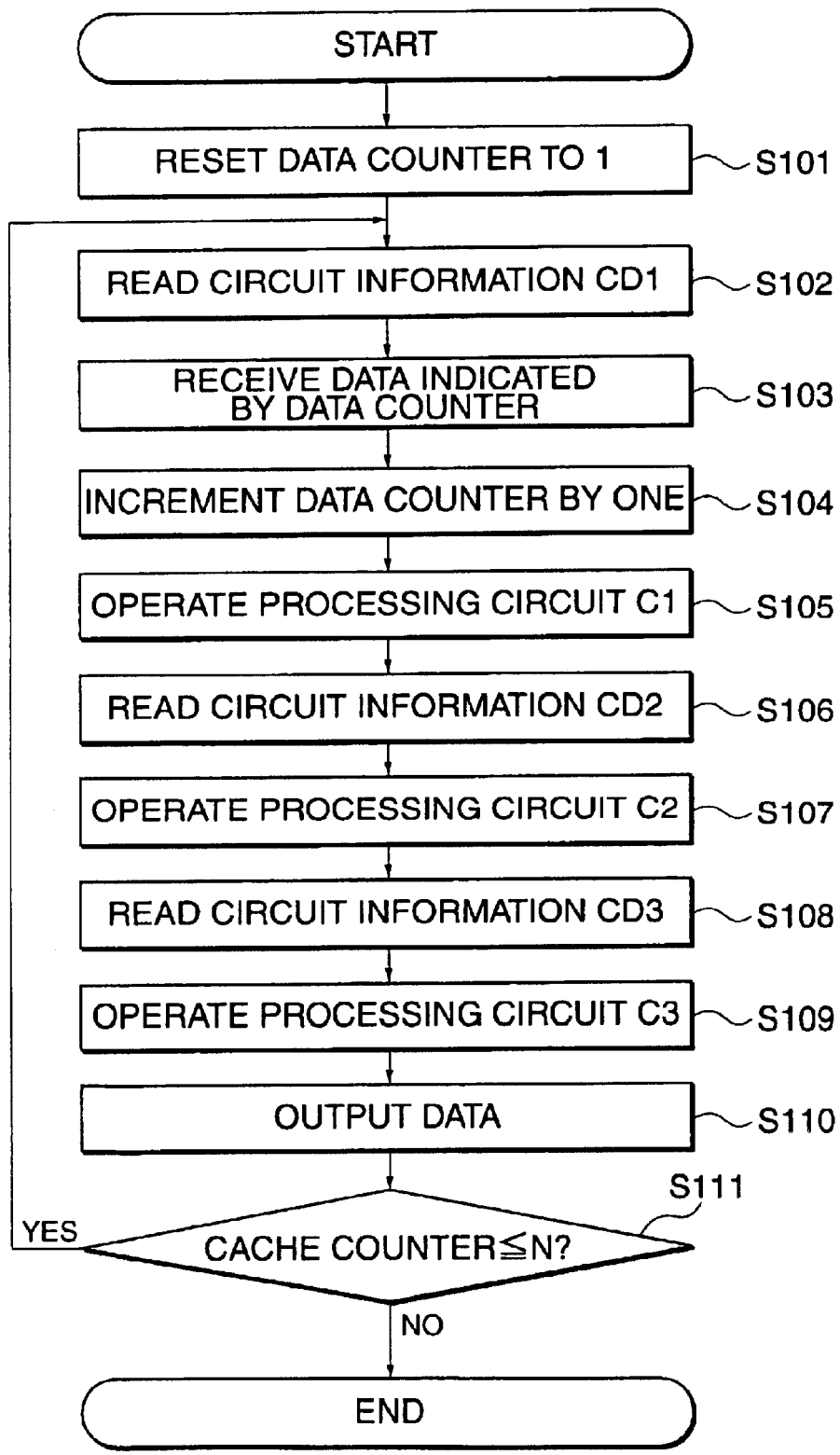
FIG. 26 is a flowchart for explaining the example shown in FIG. 24.
Figure 27:
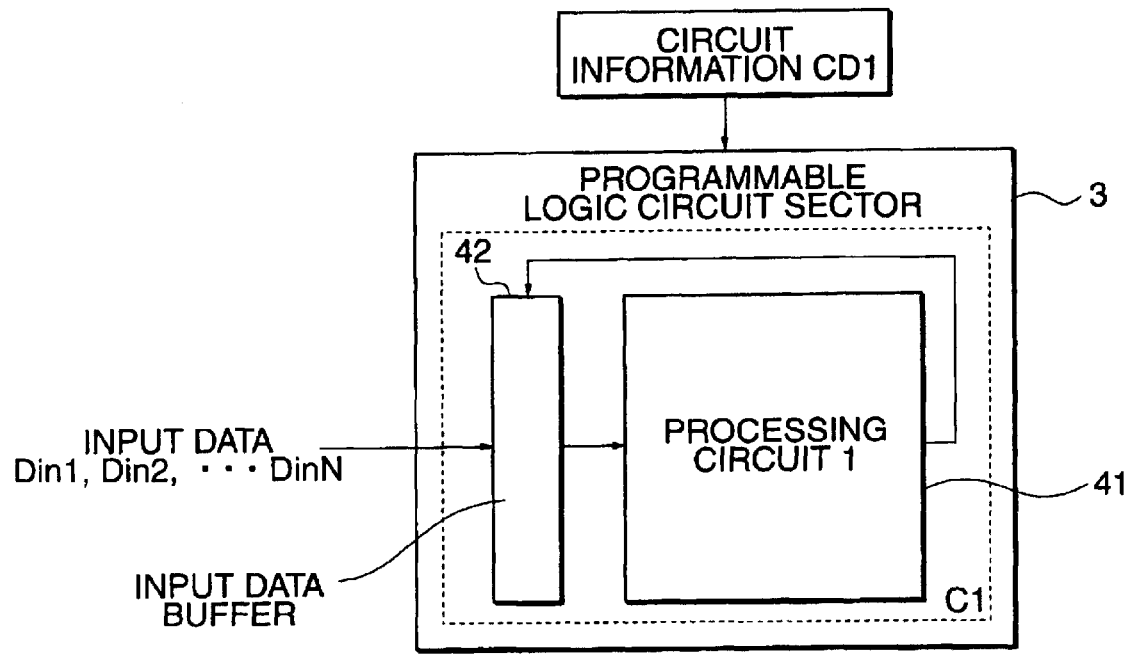
FIG. 27 shows an example of a circuit configured based upon circuit information used in the example shown in FIG. 24.
Figure 28:
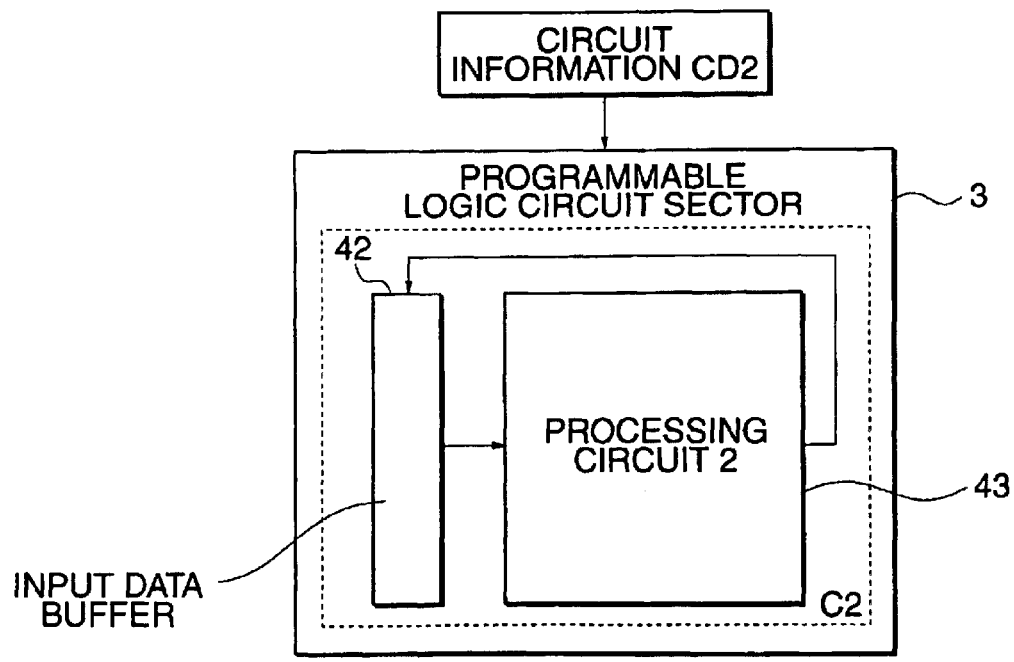
FIG. 28 shows an example of a circuit configured based upon circuit information used in the example shown in FIG. 24.
Figure 29:
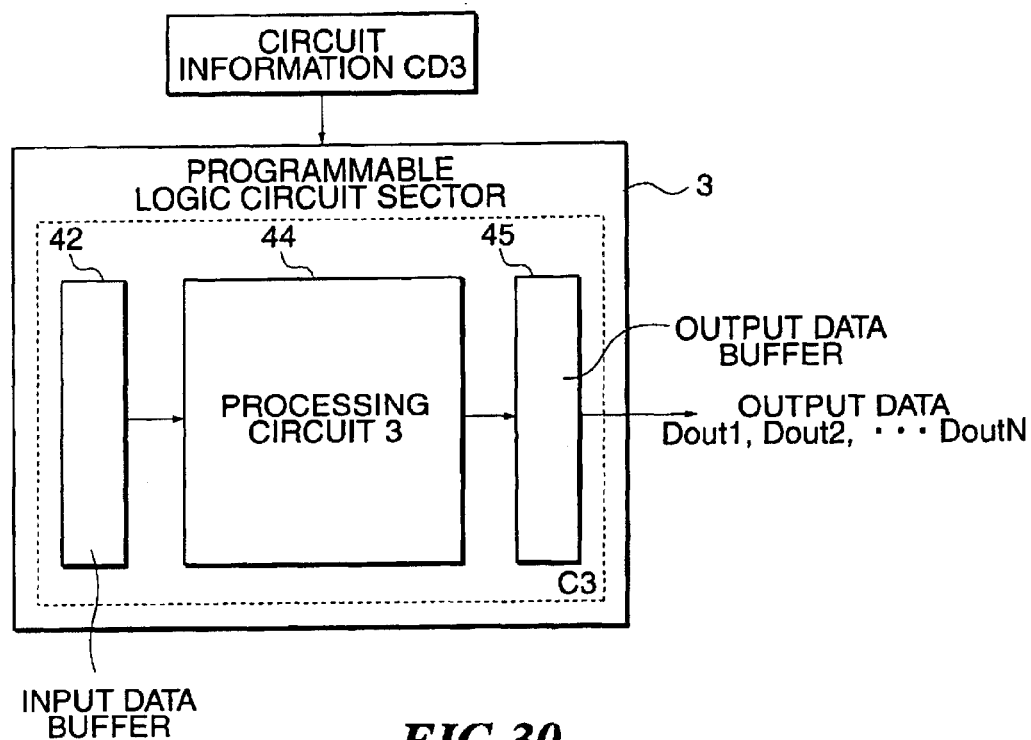
FIG. 29 shows an example of a circuit configured based upon circuit information used in the example shown in FIG. 24.
Figure 30:
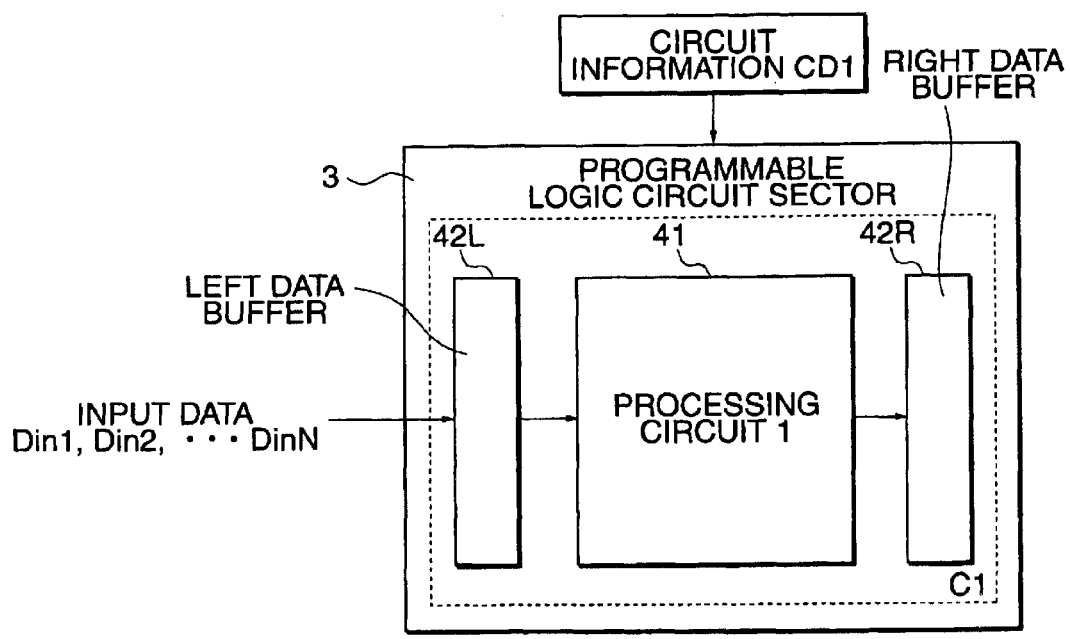
FIG. 30 shows another example of the circuit configured based upon the circuit information used in the example shown in FIG. 24.
Figure 31:
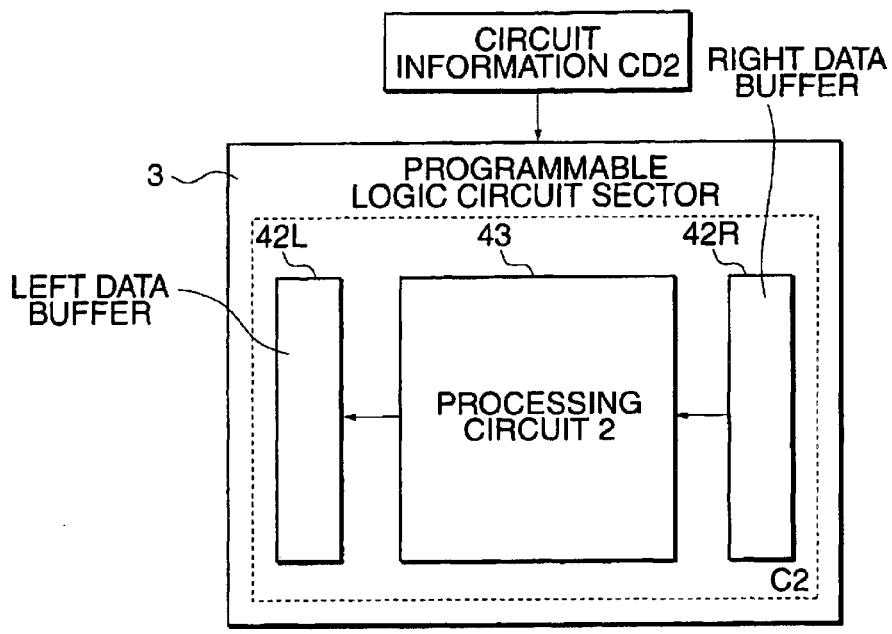
FIG. 31 shows another example of the circuit configured based upon the circuit information used in the example shown in FIG. 24.
Figure 32:
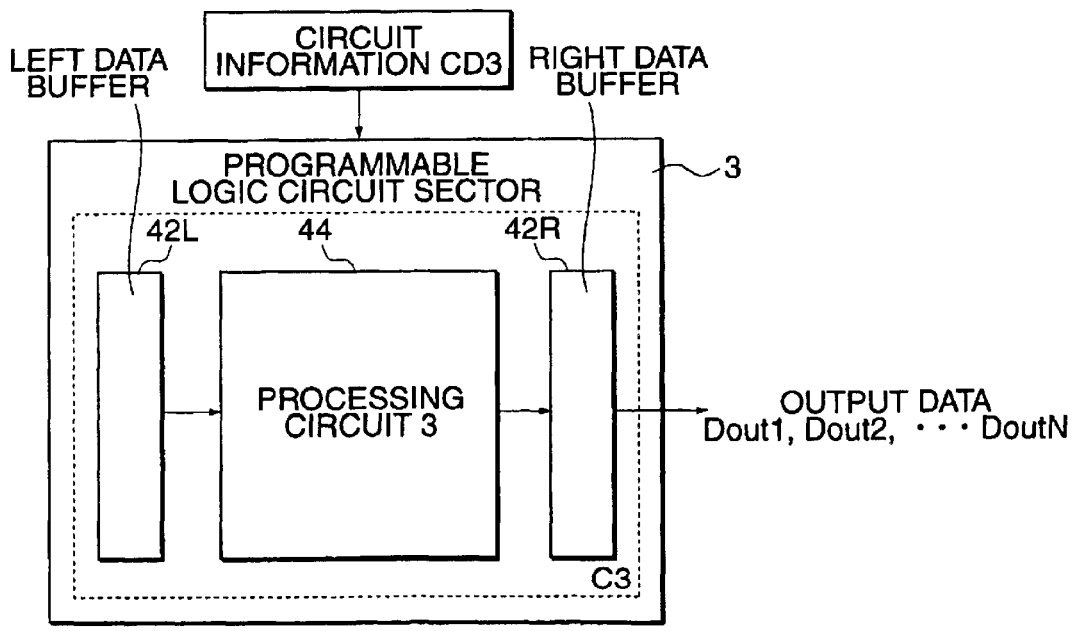
FIG. 32 shows another example of the circuit configured based upon the circuit information used in the example shown in FIG. 24.
Figure 35:
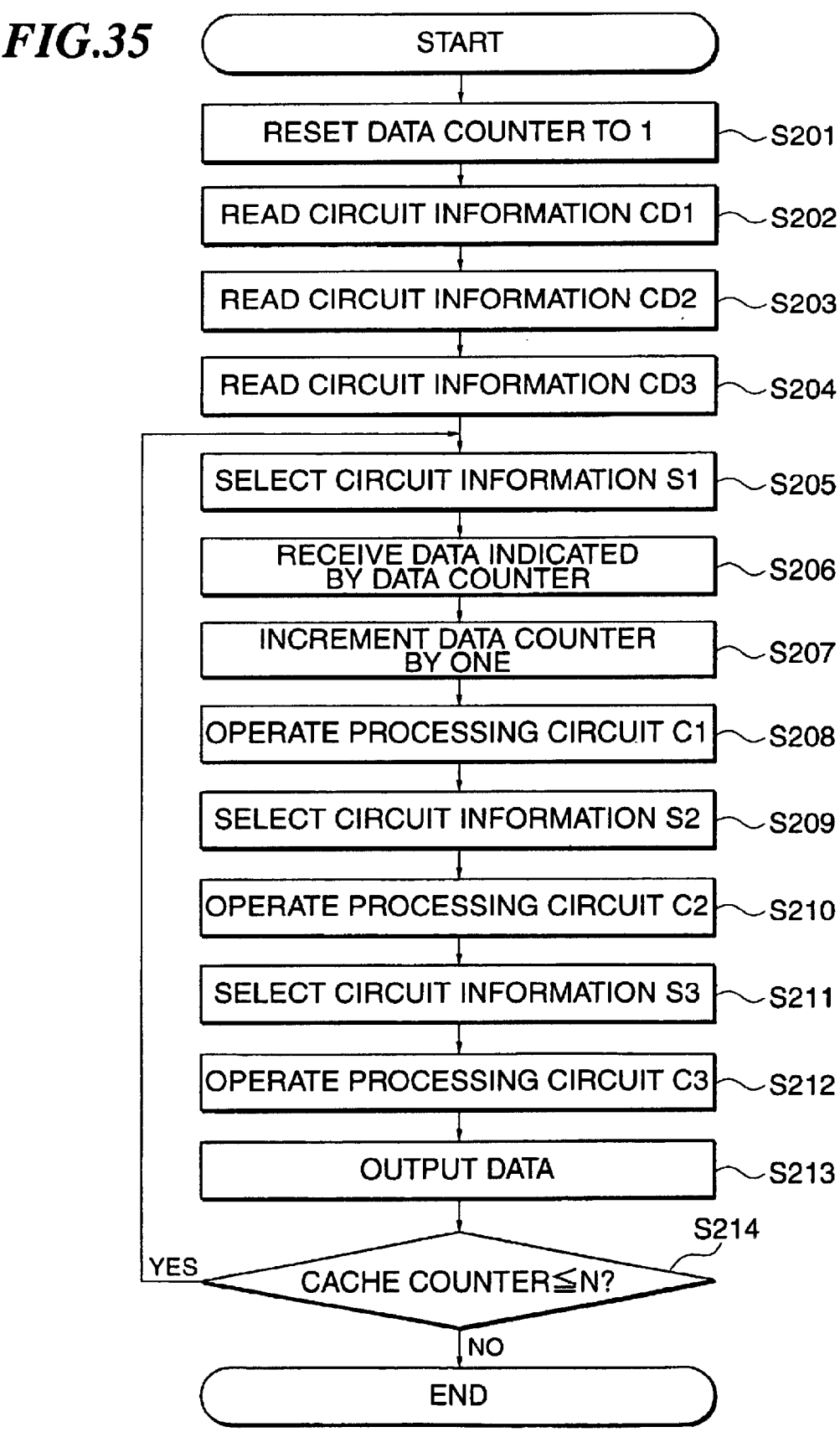
FIG. 35 is a flowchart for explaining the example shown in FIG. 33.

The programmable logic device 70 provided with the third structure has a merit that it can be configured using a general purpose programmable logic device existing since heretofore shown in FIG. 17.

-Description of Embodiment of Information Processing System and Data Processing Method- -First Embodiment- In an embodiment of an information processing system and a data processing method according to the invention, data processing for sequentially processing input data in units of block by plural circuits is executed by the information processing system using any of the programmable logic device 50 provided with the first structure, the programmable logic device 60 provided with the second structure and the programmable logic device 70 provided with the third structure as described in the item of the problems to be solved by the invention.

Data processing for sequentially processing N blocks (N sets) of input data Din1, Din2, - - - , DinN by processing circuits C1, C2 and C3 configured by sequentially reading circuit information CD1, CD2 and CD3 in a configuration memory 52M of a programmable logic circuit sector 52 via a circuit information input controller 51 and acquiring N blocks (N sets) of output data Duot1, Dout2, - - - , DoutN will be described in an example described below.

The data processing can be executed in two modes of a slave mode in which the programmable logic device is controlled by an application controller of the information processing system and a master mode in which control is temporarily transferred from the application controller of the information processing system to an application controller of the programmable logic device. Data processing in each mode will be described below.

-Slave Mode-

FIG. 4 shows an example of the configuration of the information processing system in the slave mode and the example is a case using the programmable logic device 50 provided with the first structure.

The information processing system includes an application controller 101, a circuit information storage 102, an input data storage 103, an output data storage 104 and the programmable logic device 50.

The application controller 101 controls the whole data processing. The application controller 101 is provided with a data counter 201 that indicates a block (a block number) to be processed of input data and a cache counter 202 that indicates a block (a block number) of data stored in the data cache 53.

The circuit information storage 102 stores three circuit information pieces CD1, CD2 and CD3 in this example and provides any circuit information to the programmable logic device 50 according to a direction from the application controller 101.

The input data storage 103 stores input data pieces Din1, Din2, - - - , DinN and inputs required input data to the programmable logic device 50 according to a direction from the application controller 101.

The output data storage 104 stores output data pieces Duot1, Dout2, - - - , DoutN respectively output from the programmable logic device 50 according to a direction from the application controller 101.

Figure 6:
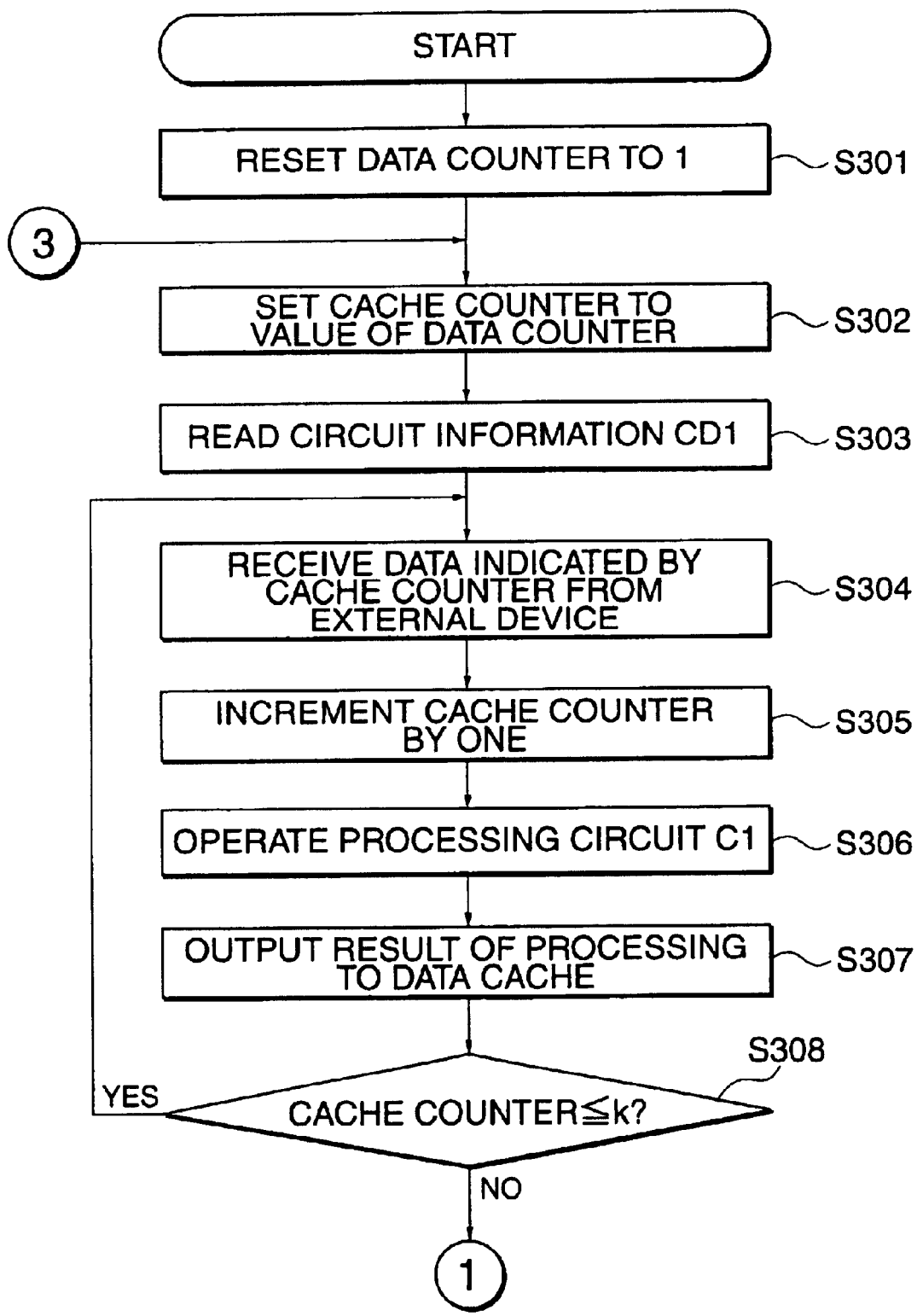
FIG. 6 is a part of a flowchart used for explaining the operation in the embodiment of the data processing method according to the invention.
Figure 7:
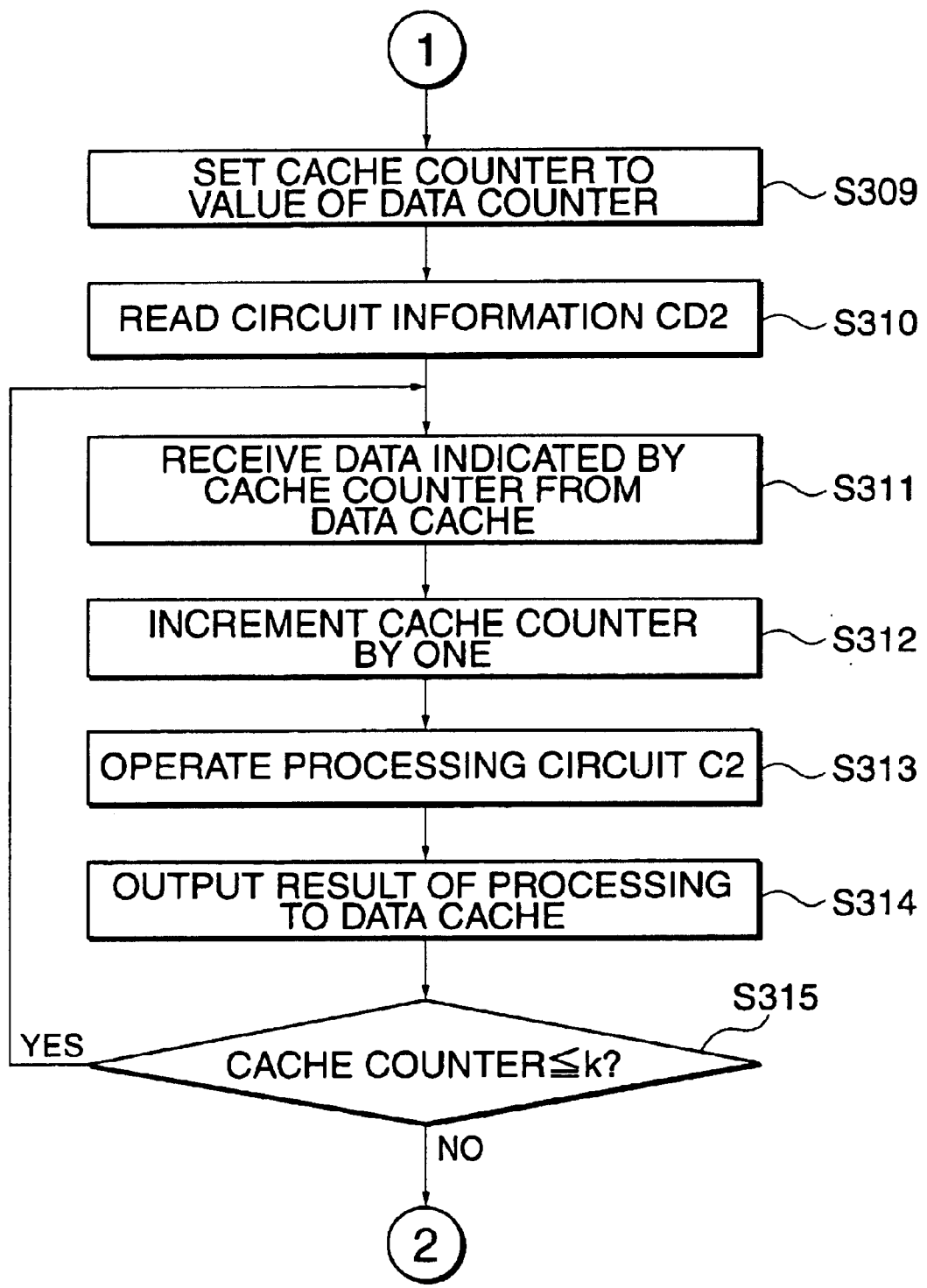
FIG. 7 is a part of the flowchart used for explaining the operation in the embodiment of the data processing method according to the invention.
Figure 8:
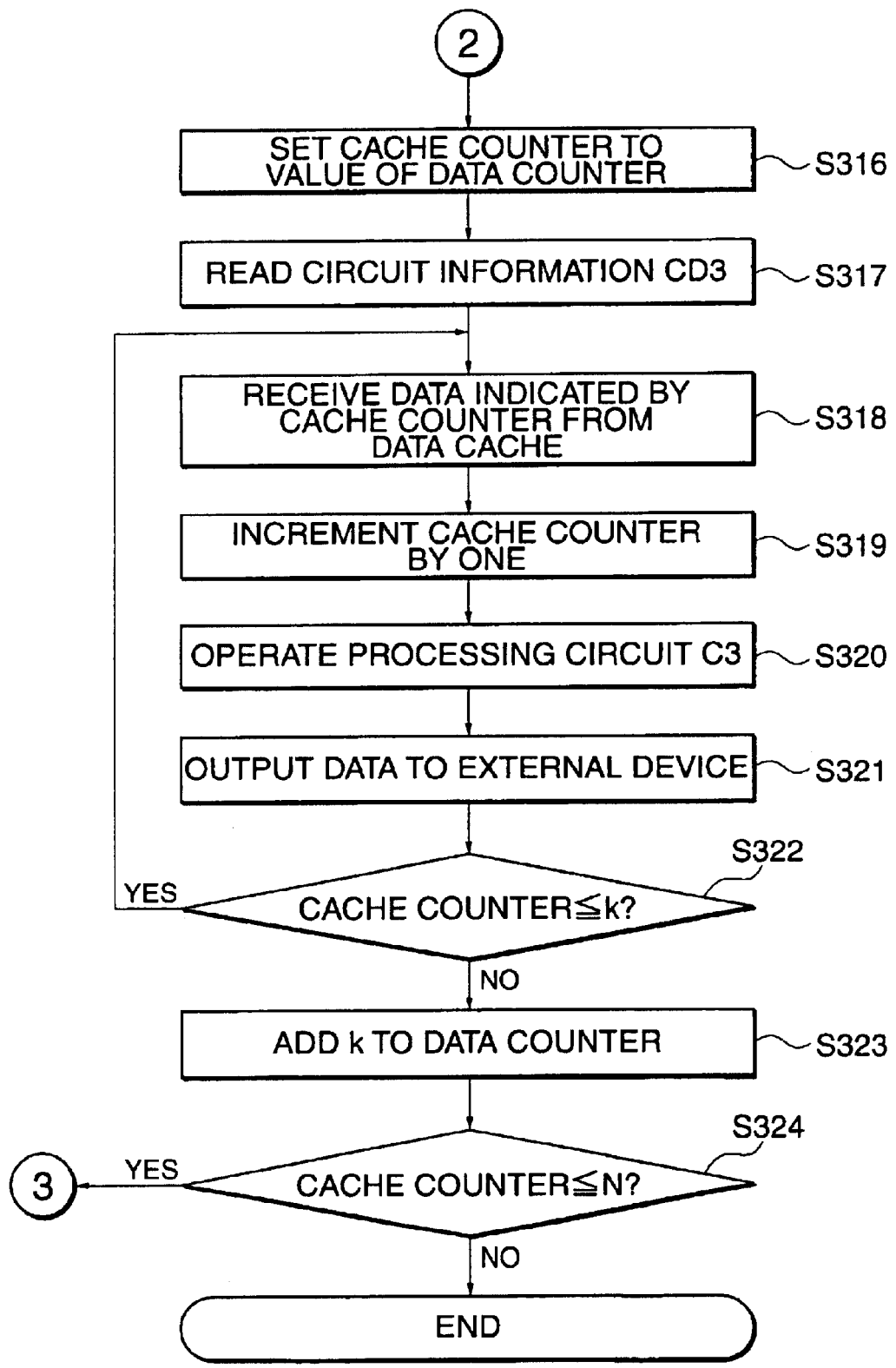
FIG. 8 is a part of the flowchart used for explaining the operation in the embodiment of the data processing method according to the invention.

Next, referring to a timing chart shown in FIG. 5 and flowcharts shown in FIGS. 6 to 8, the data processing described above using the information processing system will be described.

When processing is started, a value of the data counter 201 that indicates a block of input data is reset to 1 (a step S301) by the application controller 101 and a value of the cache counter 202 that indicates a block of data stored in the data cache 53 of the programmable logic device 50 is set to a value of the data counter 201 (a step S302).

Next, circuit information CD1 is read in the configuration memory 52M from the circuit information storage 102 via the circuit information input controller 51 of the programmable logic device 50 according to a direction from the application controller 101 and a processing circuit C1 is configured in the programmable logic circuit sector 52 (a step S303). The contents described above are equivalent to a reading execution state shown as first "reading" in the timing chart shown in FIG. 5.

When the processing circuit C1 is configured in the programmable logic device 50, a destination from which the input data switching circuit 522 acquires input data is set to the input data storage 103 outside the programmable logic device 50 by the application controller 101 and the block Din1 indicated by the cache counter 202 of input data is input from the input data storage 103 to the processing circuit C1 according to a direction from the application controller 101 (a step S304).

When the data is input, a value of the cache counter 202 is incremented by one by the application controller 101 (a step S305). The input data Din1 is processed in the processing circuit C1 (a step S306), the output destination of the output data switching circuit 523 is set to the data cache 53 by the application controller 101 and the data of the result of the processing is output to the data cache 53 (a step S307).

Next, a value of the cache counter 202 and a value k described later are compared by the application controller 101 (a step S308), in case the value of the cache counter 202 is smaller than k, processing is returned to the step S304, a block indicated by the cache counter 202 of input data (the block Din2 in this case because a value of the cache counter 202 is 2) is input again from the input data storage 103 to the processing circuit C1 according to a direction from the application controller 101, the processing from the step S305 to the step S307 is executed and the result of the processing is output to the data cache 53.

The operation from the step S304 to the step S307 is repeated until it is judged that a value of the cache counter 202 is larger than the value k in the step S308. The processing described above by the processing circuit C1 starting from the input of the data is equivalent to a data processing execution state shown as first "data processing" in the timing chart shown in FIG. 5.

The value of k is set according to the capacity of the data cache 53 and is an integral value that does not exceed the number of blocks of input data which can be stored in the data cache 53. Generally, the larger this value is, the fewer the frequency of reading circuit information becomes and the shorter time required for reconfiguration becomes, compared with time required for reconfiguring a circuit in conventional type reconfigurable computing.

However, as described later, in case plural processing is executed in parallel, the value of k is required to be determined in consideration of a cycle of reading circuit information in each processing operation.

When a value of the cache counter 202 is larger than k (a step S308), a value of the cache counter 202 is set as a value of the data counter 201 (a value of the data counter 201 at this time is 1) by the application controller 101 to process k blocks processed in the processing circuit C1 and stored in the data cache 53 in the next processing circuit C2 (a step S309).

Next, the circuit information CD2 is read in the configuration memory 52M from the circuit information storage 102 via the circuit information input controller 51 according to a direction from the application controller 101 and the processing circuit C2 is configured in the programmable logic circuit sector 52 (a step S310). The contents described above are equivalent to a reading execution state shown as second "reading" in the timing chart shown in FIG. 5.

When the processing circuit C2 is configured in the programmable logic device 50, a destination from which the input data switching circuit 522 acquires input data is set to the data cache 53 by the application controller 101 and the block Dca1 of data in the data cache 53 indicated by the cache counter 202 is input from the data cache 53 to the processing circuit C2 according to a direction from the application controller 101 (a step S311).

When the data is input, a value of the cache counter 202 is incremented by one by the application controller 101 (a step S312). The input data Dca1 is processed in the processing circuit C2 (a step S313), the output destination of the output data switching circuit 523 is set to the data cache 53 by the application controller 101 and the data of the result of the processing is output to the data cache 53 (a step S314).

Next, a value of the cache counter 202 and the value k are compared (a step S315), in case the value of the cache counter 202 is smaller than k, processing is returned to the step S311, a block of data indicated by the cache counter 202 is input again from the data cache 53 to the processing circuit C2 according to a direction from the application controller 101, the processing from the step S312 to the step S314 is executed and the result of the processing is output to the data cache 53.

The operation in the steps S311 to S314 is repeated until it is judged in the step S315 that a value of the cache counter 202 is larger than k. The contents from the input of data to the processing circuit C2 to processing by the processing circuit C2 are equivalent to a data processing execution state shown as second "data processing" in the timing chart shown in FIG. 5.

When a value of the cache counter 202 is larger than k (a step S315), a value of the cache counter 202 is set as a value of the data counter 201 (a value of the data counter 201 at this time is 1) by the application controller 101 to process k blocks processed in the processing circuit C2 and stored in the data cache 53 in the next processing circuit C3 (a step S316).

Next, the circuit information CD3 is read in the configuration memory 52M from the circuit information storage 102 via the circuit information input controller 51 according to a direction from the application controller 101 and the processing circuit C3 is configured in the programmable logic circuit sector 52 (a step S317). The contents described above are equivalent to a reading execution state shown as third "reading" in the timing chart shown in FIG. 5.

When the processing circuit C3 is configured in the programmable logic device 50, a destination from which the input data switching circuit 522 acquires input data is set to the data cache 53 by the application controller 101 and the block Dca1 of data indicated by the cache counter 202 is input from the data cache 53 to the processing circuit C3 according to a direction from the application controller 101 (a step S318).

When the data is input, a value of the cache counter 202 is incremented by one by the application controller 101 (a step S319). The input data Dca1 is processed in the processing circuit C3 (a step S320), the output destination of the output data switching circuit 523 is set to an external device by the application controller 101 and the data of the result of the processing by the processing circuit C3 is output to the output data storage 104 outside the programmable logic device 50 as output data (a step S321).

Next, a value of the cache counter 202 and k are compared (a step S322), in case the value of the cache counter 202 is smaller than k, processing is returned to the step S318, a block of data indicated by the cache counter 202 is input again from the data cache 53 to the processing circuit C3 according to a direction from the application controller 101, the processing from the step S319 to the step S321 is executed and the result of the processing is output to the output data storage 104 outside the programmable logic device. The operation in the steps S318 to S321 is repeated until it is judged in the step S322 that a value of the cache counter 202 is larger than k.

When a value of the cache counter 202 is larger than k (a step S322), k is added to a value of the data counter 201 by the application controller 101 (a step S323).

Next, a value of the data counter 201 and a value N are compared (a step S324), in case the value of the data counter 201 is smaller than N, processing is returned to the step S302, a value of the cache counter 202 is set as a value of the data counter 201 again and the operations described above are repeated. When all blocks of the input data are processed and a value of the data counter 201 is larger than N, processing is finished.

-Master Mode-

Figure 9:
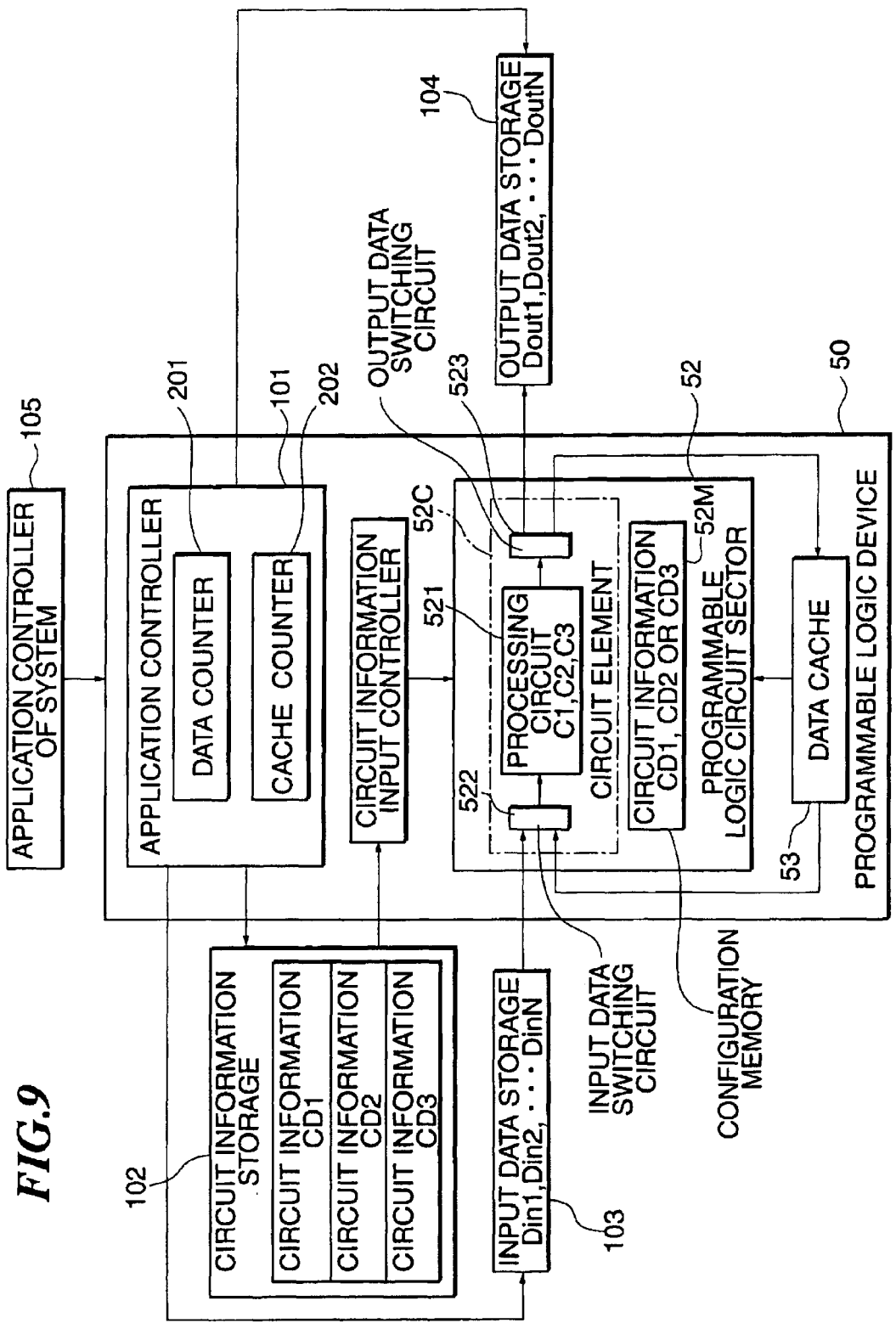
FIG. 9 shows an example of another configuration in the embodiment of the information processing system according to the invention.

Next, processing in the master mode will be described. FIG. 9 shows an example of the configuration of an information processing system in the master mode and in this example, the programmable logic device 50 provided with the first structure is also used.

In the information processing system in this example, an application controller 101 is configured based upon circuit information in the programmable logic device 50. An application controller of the system 105 is provided and processing is started by temporarily transferring control over processing executed in the programmable logic device 50 from the application controller of the system 105 to the application controller 101 in the programmable logic device 50.

When the processing is started, a value of a data counter 201 that indicates a block of input is reset to 1 by the application controller 101 formed in the programmable logic device 50 shown in FIG. 9 and a value of the cache counter 202 that indicates a block of data stored in the data cache 53 is set as a value of the data counter 201.

Next, N blocks of input data pieces Din1, Din2, - - -, DinN stored in an input data storage 103 are sequentially processed in processing circuits C1, C2 and C3 configured by sequentially reading circuit information CD1, CD2 and CD3 in a configuration memory 52M of a programmable logic circuit sector 52 from a circuit information storage 102 via a circuit information input controller 51 according to the same procedure as that in the processing in the slave mode described above and N blocks of output data pieces Duot1, Dout2, - - -, DoutN are output to an output data storage 104.

When the processing is finished, control over the programmable logic device 50 is transferred again to the application controller 105 of the system.

Both in the slave mode and in the master mode, k blocks of data are processed by reading circuit information three times and succeeding data processing. All the input data is processed by repeating the cycle N/k times.

The embodiment described above is a case that a used programmable logic device is the programmable logic device 50 provided with the first structure, however, substantially the similar data processing can also be executed using the programmable logic device 60 provided with the second structure or the programmable logic device 70 provided with the third structure.

However, as the programmable logic device 60 is provided with the input data switch 61 and the output data switch 62 respectively having the same function as the input data switching circuit 522 and the output data switching circuit 523 respectively configured by reading circuit information in case the programmable logic device 60 provided with the second structure is used, there is a merit that the circuit information is relatively small and time required for reconfiguration can be more reduced.

Also, as the function of the data cache 53 is realized by a data cache circuit 524 configured based upon circuit information in case the programmable logic device 70 provided with the third structure is used, there is a merit that the increase of power consumption and the increase of the cost of a chip respectively caused by the enlargement of the scale of a circuit can be prevented.

As described above, according to the conventional type method, only one block of data is processed by reading circuit information three times and the succeeding data processing. As a result, to process all input data, the cycle is required to be repeated by the number N of blocks of the input data.

Compared with it, according to the data processing method in the embodiment described above of the invention, the number of cycles required for processing all input data is N/k. That is, the frequency of reading circuit information is reduced up to 1/k using the invention and time required for the reconfiguration of a circuit can be greatly reduced.

In the programmable logic devices 50 and 60 respectively provided with the first structure and the second structure, an extra memory area is required for the data cache 53. However, as the data cache 53 can be formed in a part separate from the programmable logic circuit sector 52 unlike an extra configuration memory required for multi-context technique, the deterioration of the performance of the circuit caused by the increase of the load capacity of the circuit element 52C is never caused.

Also, in the embodiment described above, as the effect of the reduction of time required for the reconfiguration of a circuit is large even if the data cache is configured by a memory small in capacity, compared with an extra configuration memory required for multicontext technique, the increase of power consumption and the increase of the cost of a chip respectively caused by the enlargement of the scale of the circuit are slight.

-Concrete Example of Data Processing in First Embodiment-

For a concrete example of the first embodiment described above of the data processing according to the invention, a case of Joint Photographic Coding Expert Group (JPEG) image compression processing will be described next.

(Image Compression According to JPEG)

FIG. 10 is a basic block diagram showing image compression processing according to JPEG. Discrete cosine transform (DCT), quantization and entropy coding are applied to an input image in units of 8×8 pixel block and compressed data is output.

Input image data is divided into an 8×8 pixel block and two-dimensional DCT is applied to each divided block by a discrete cosine transformer 81. As a result of the transformation, 64 DCT coefficients are acquired.

To enhance the efficiency of coding, the acquired 64 DCT coefficients are linearly quantized using a quantization table 83 in step size different for every DCT coefficient in a quantizer 82.

The quantized 64 coefficients are coded in an entropy unit in an entropy coder 84 referring to a coding table 85 to be compressed data. For an entropy coding method, Huffman coding is used.

In this example, JPEG image compression processing is divided into three processing of DCT, quantization and entropy coding, and the data processing method equivalent to the first embodiment described above of the invention is applied. That is, circuit information corresponding to DCT, quantization and entropy coding is respectively circuit information pieces CD1, CD2 and CD3 and configured circuits are respectively the circuits C1, C2 and C3.

(Configuration in Concrete Example)

A circuit for each processing of DCT, quantization and entropy coding is respectively including approximately 30 k gates, approximately 30 k gates and approximately 40 k gates. In this concrete example, a device equivalent to XCV50 manufactured by Xilinx having 57,906 system gates is used. XCV50 is an FPGA-type programmable logic device which can be dynamically partially reconfigured and the capacity of a configuration memory is 559,232 bits.

In case the first embodiment of the invention is applied, the device equivalent to XCV50 shall be provided with a data cache of the same 559,232 bits as the capacity of the configuration memory.

Also, to compare the effect of the invention with that of prior art, a device equivalent to XCV50 based upon multi-context technique provided with three configuration memories (559,232 bits×3 1677,696 bits) corresponding to each processing of DCT, quantization and entropy coding shall also be supposed.

An image to be processed is an image including 1024 pixels×1024 pixels×8 bits. As a processing unit is an 8×8 pixel block (8 pixels×8 pixels×8 bits=512 bits/block), the number of blocks of input data is 16,384 acquired by calculating (1024 pixels×1024 pixels)/(8 pixels×8 pixels).

As the number of digits of data is increased during processing though the precision of input data is 8 bits, the data cache 53 or the data cache circuit 524 shall store data in units of 16 bits. At this time, the maximum value of the number k of blocks of data which the data cache 53 or the data cache circuit 524 can store is 546.125 acquired by calculating 559,232 bits/(8 pixels×8 pixels×16 bits). In this concrete example, k=512.

(Time Required For Reconfiguration in Case Conventional Type Programmable Logic Device is Used)

First, circuit configuration time in conventional type reconfigurable computing using XCV50 which can be dynamically partially reconfigured will be estimated.

As already described, one block of data is processed by reading circuit information three times and the succeeding data processing and all input data is processed by repeating this cycle by the number N of blocks of the input data. Therefore, if time required for reading three circuit information pieces is respectively Tcd1, Tcd2 and Tcd3, circuit configuration time T (conventional type) required for processing N blocks of data is as follows.

$$T \text{ (conventional type)} = (Tcd1 + Tcd2 + Tcd3) \times N$$

(Time Required for Reconfiguration in Case Multicontext Technique is Used)

Next, circuit configuration time in reconfigurable computing based upon multicontext technique using a device equivalent to XCV50 provided with three configuration memories will be estimated.

As already described, circuit information is read only once at the beginning of processing and one block of data is processed by the selection of circuit information of three times according to a selection signal and the succeeding data processing. All input data is processed by repeating this cycle by the number N of blocks of the input data. Therefore, if time required for the selection of three circuits is respectively Ts1, Ts2 and Ts3, circuit configuration time T (multicontext) required for processing N blocks of data is as follows.

$$T\text{ (multicontext)}=(Tcd1+Tcd2+Tcd3)+(Ts1+Ts2+Ts3)\times N$$

As Ts1, Ts2 and Ts3 are sufficiently small, compared with Tcd1, Tcd2 and Tcd3, they are approximate to "T (multicontext) (Tcd1+Tcd2+Tcd3)".

(Time Required for Reconfiguration by Data Processing Method Using Programmable Logic Device 50 Provided with First Structure According to the Invention)

Next, circuit configuration time in reconfigurable computing by the data processing method in the first embodiment using the programmable logic device 50 provided with the first structure according to the invention using a device equivalent to XCV50 provided with a data cache having the same capacity as the configuration memory will be estimated.

As already described, k blocks of data are processed by reading circuit information three times and the succeeding data processing. All input data is processed by repeating this cycle by N/k times. Therefore, circuit configuration time T (the invention) required for processing N blocks of data is as follows.

$$T\text{ (the invention)}=(Tcd1+Tcd2+Tcd3)\times N/k$$

(Comparison in Circuit Configuration Time)

In this concrete example, N=16,384 and k=512. Therefore, if circuit configuration time is compared using T (conventional type) as a criterion, it is as follows.

T (multicontext)=T (conventional type)/N
=T (conventional type)/16384
$\cong 6.1\times 10^{-5}$T (conventional type)
T (the invention)=T (conventional type)/k
=T (conventional type)/512
$\cong 2.0\times 10^{-3}$T (conventional type)

The method based upon multicontext technique and the method according to the invention prove to be able to greatly reduce circuit configuration time, compared with that in a conventional type method. The method according to the invention can reduce circuit configuration time up to 1/512, compared with that in the conventional type method. The method based upon multicontext technique can further reduce circuit configuration time up to 512/16384=1/32, compared with the method according to the invention.

Therefore, if compared in only circuit configuration time, the method based upon multicontext technique is more effective than the method according to the invention, however, multicontext technique has problems such as the deterioration of the performance of a circuit, the increase of power consumption and the increase of the manufacturing cost as described next.

(Comparison in Performance of Circuit, Power Consumption and Manufacturing Cost)

The performance of a circuit will be compared with the RC time constant of a programmable logic circuit sector, the power consumption will be compared with that of the whole semiconductor chip forming a programmable logic device and the manufacturing cost will be compared with that of the semiconductor chip. These values will be estimated based upon the ratio of the area of each device shown in FIG. 11.

For the ratio of the area in a device equivalent to XCV50 according to the conventional type method, a configuration memory of a programmable logic circuit sector accounts approximately 50%, a circuit element of the programmable logic circuit sector accounts for approximately 40% and a controller including a circuit information input controller accounts for approximately 10%.

The ratio of the area in multicontext technique to a device equivalent to XCV50 in the first embodiment of the invention will be described next using the ratio of the area (configuration memory: circuit element: controller)= (0.5:0.4:0.1) as a criterion.

As a device equivalent to XCV50 based upon multicontext technique is provided with three configuration memories in a programmable logic circuit sector, the ratio of the area is (configuration memory: circuit element: controller)= (1.5:0.4:0.1) and the ratio of the area of the whole chip is 2.0.

As a data cache equivalent to a configuration memory is newly provided though a programmable logic circuit sector of a device equivalent to XCV50 in the first embodiment of the invention is the same as that in a conventional type, the ratio of the area is (configuration memory: circuit element: controller: data cache)=(0.5:0.4:0.1:0.5) and the ratio of the area of the whole chip is 1.5.

The resistance R and the capacity C of the programmable logic circuit sector are proportional to the length L of circuit wiring. As the length L of the circuit wiring is substantially proportional to the square root of the area S of the circuit, an RC time constant is proportional to $L^2=S$ (programmable logic circuit sector).

If the driving frequency of the circuit is f and driving voltage is V, the power consumption of the whole device is proportional to $fCV^2$. As the capacity C is proportional to the square root of the area S of the whole device, the power consumption is proportional to the square root of S (the whole).

As the manufacturing cost is proportional to the area of the whole device, it is proportional to S (the whole).

FIG. 12 shows together the result of comparison in the performance of the circuit, the power consumption and the manufacturing cost between a method based upon multicontext technique using the conventional type device as a criterion and a method in the first embodiment of the invention.

As shown in FIG. 12, in the method based upon multicontext technique provided with an extra configuration memory in the programmable logic circuit sector, the performance of the circuit is greatly deteriorated, and the power consumption and the manufacturing cost are also increased.

In the meantime, in the method according to the invention provided with a data cache outside the programmable logic circuit sector, the performance of the circuit is not deteriorated and the increase of the power consumption and the manufacturing cost is also small, compared with that in the method based upon multicontext technique.

The deterioration of the performance of the circuit in the method based upon multicontext technique becomes conspicuous in case many configuration memories shown in a second embodiment of the next data processing method are required.

-Second Concrete Example of Data Processing Method-

A concrete example in which the data processing method in the first embodiment of the invention is applied in case two processing operations are simultaneously executed in parallel will be described as a second example below.

Figure 13:
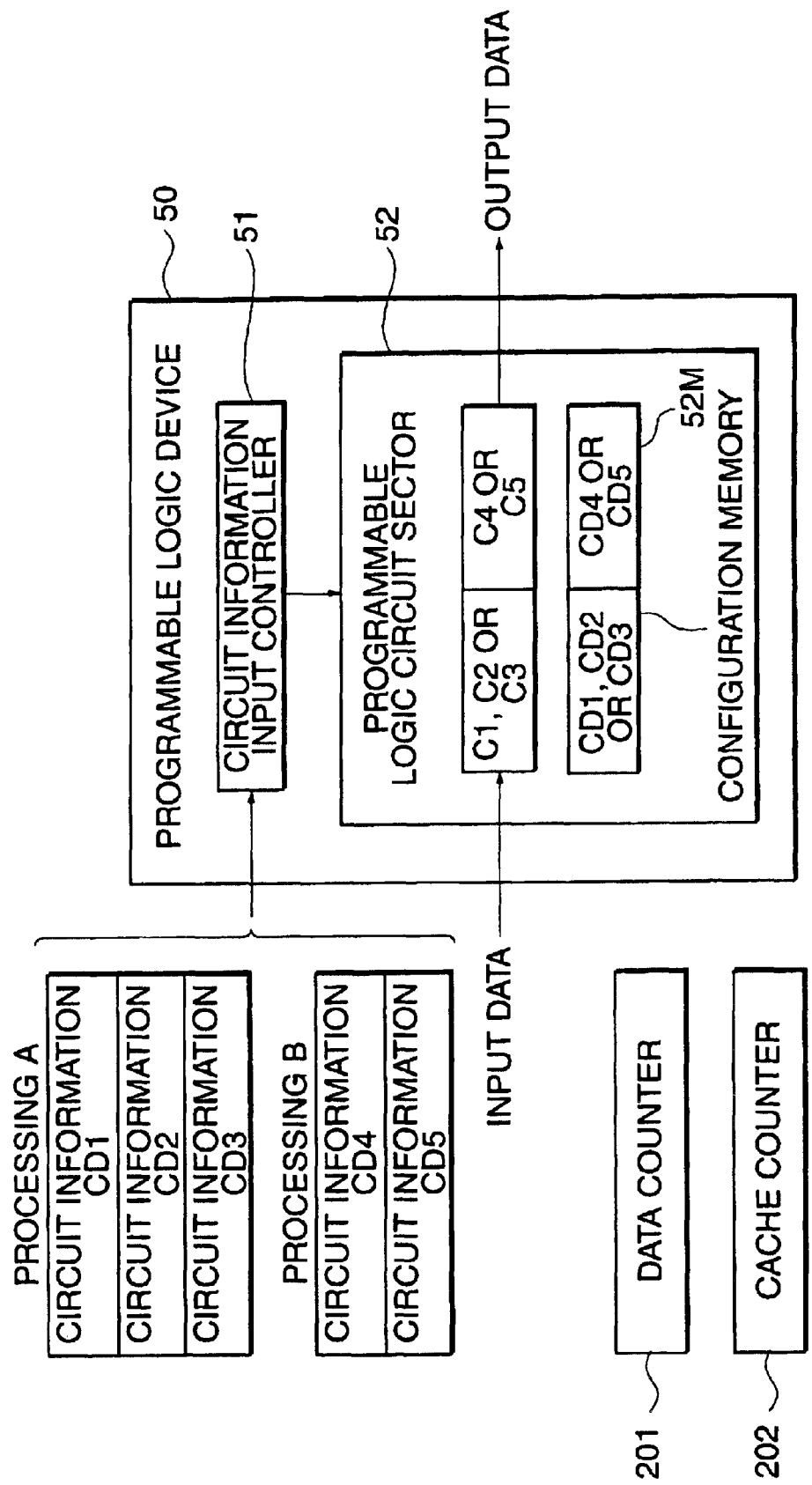
FIG. 13 is an explanatory drawing for explaining a second embodiment of the data processing method according to the invention.

In the second example, as shown in FIG. 13, first processing (processing A) is executed in processing circuits C1, C2 and C3 configured by sequentially reading circuit information pieces CD1, CD2 and CD3 in a configuration memory 52M of a programmable logic circuit sector 52 via a circuit information input controller 51 and simultaneously in parallel, second processing (processing B) is executed in processing circuits C4 and C5 configured by sequentially reading circuit information pieces CD4 and CD5 in the configuration memory 52M of the programmable logic circuit sector 52 via the circuit information input controller 51. In FIG. 13, a data cache is not shown.

(Parallel Processing According to Conventional Type Method)

Figure 14:
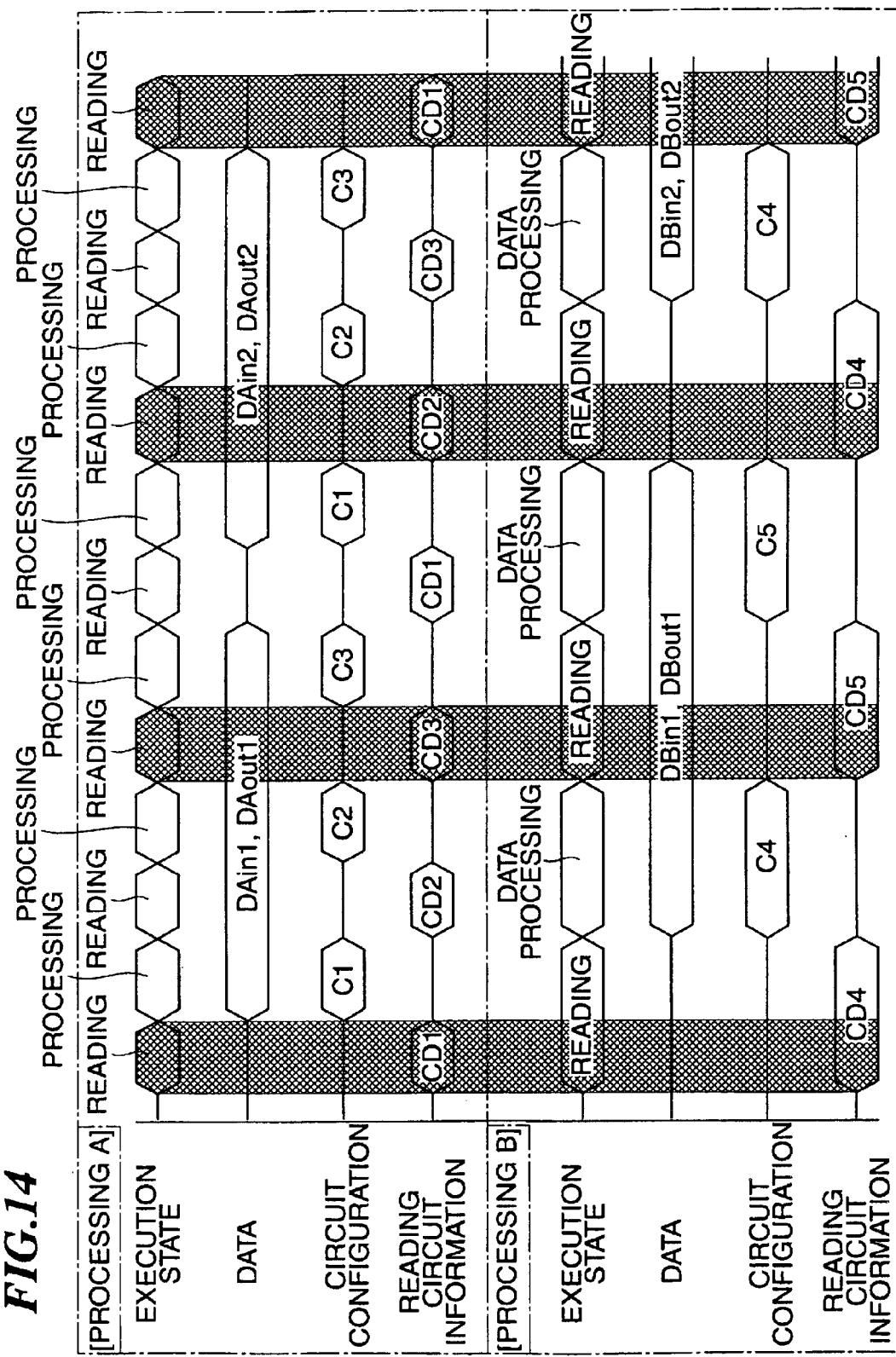
FIG. 14 is a timing chart for explaining parallel data processing using a conventional type programmable logic device.

FIG. 14 shows a timing chart in case the processing A and the processing B are separately executed according to a conventional type method. At timing of a part where halftone dot meshing is applied shown in FIG. 14, reading circuit information simultaneously occurs in the processing A and the processing B. However, the circuit information input controller of the programmable logic device cannot simultaneously read plural circuit information pieces.

Figure 15:
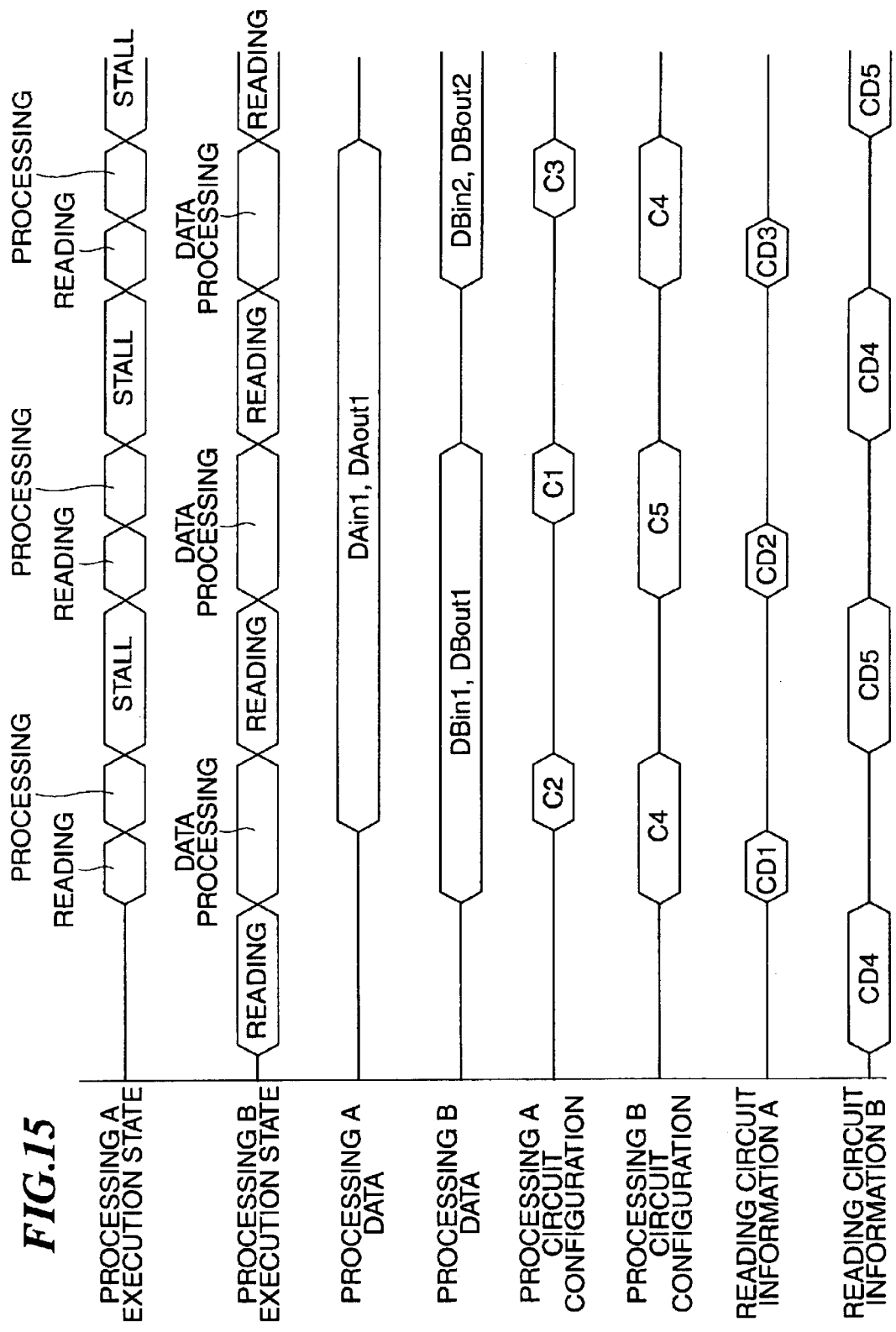
FIG. 15 is a timing chart for explaining parallel data processing using a conventional type programmable logic device.

Therefore, in case two processing are executed in parallel according to the conventional type method, priority is given to processing and reading circuit information is required to prevent from simultaneously occurring. FIG. 15 shows a timing chart in case priority is given to the processing B for example and parallel processing is executed according to the conventional type method.

As clear from FIG. 15, in the processing A, circuit information CD2 cannot be read until reading circuit information in the processing B is finished even if processing by the circuit C1 is finished, and a waiting state (a stall) occurs.

The occurrence of a stall causes a problem that execution time in the processing A is remarkably extended.

(Parallel Processing in Embodiment of the Invention)

Figure 16:
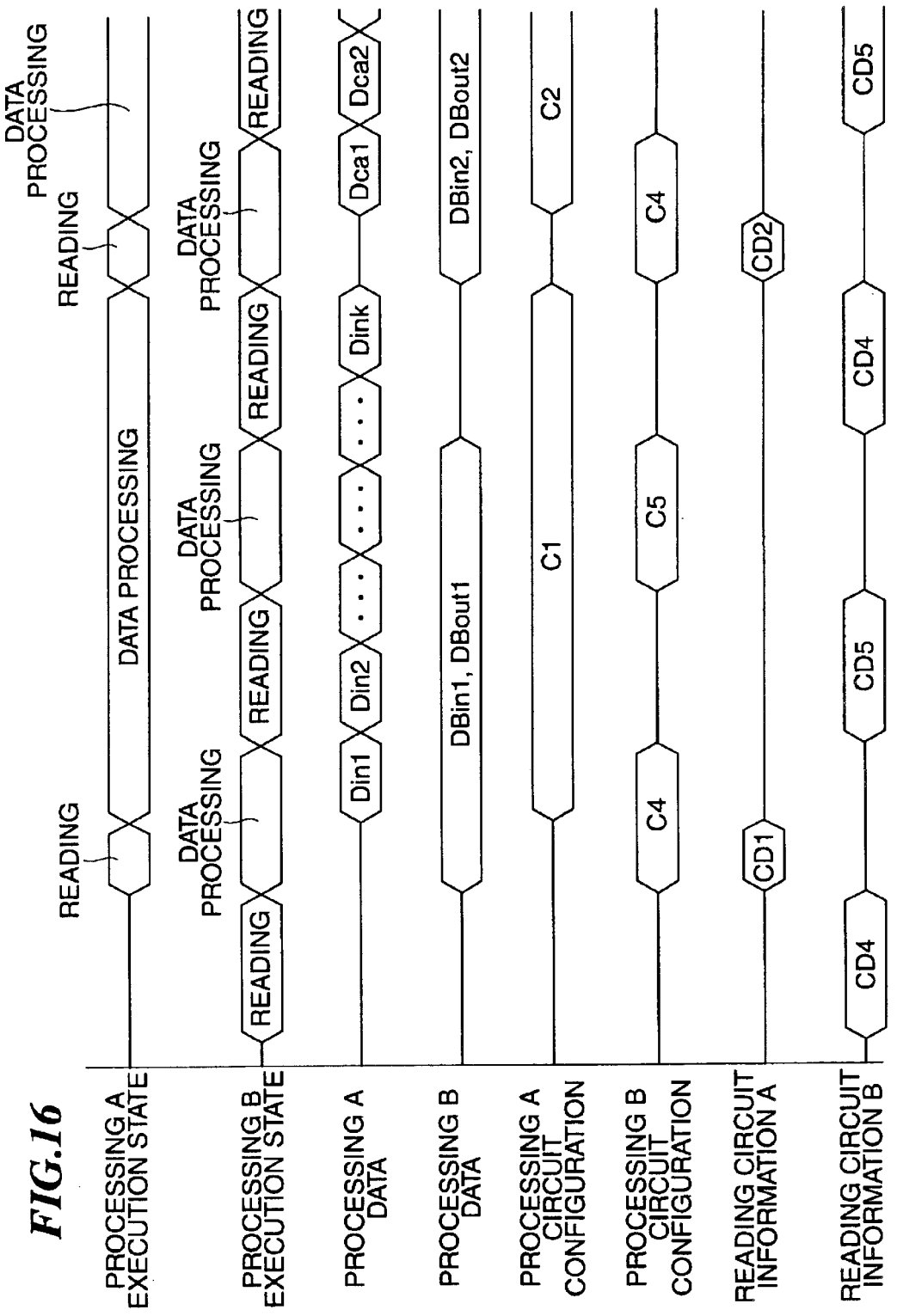
FIG. 16 is a timing chart for explaining parallel data processing using the embodiment of the data processing method according to the invention.

FIG. 16 is a timing chart in case the invention is applied. As shown in FIG. 16, the processing A and the processing B can be executed in parallel by suitably selecting the number k of blocks of data stored in a data cache without causing a stall. As a result, the processing speed of the whole system can be enhanced by parallel processing.

(Parallel Processing by Multicontext Technique)

As configuration memories which can correspond to any combination of circuit information pieces CD1, CD2 and CD3 of the processing A and circuit information pieces CD4 and CD5 of the processing B are required in case the processing A and the processing B are processed in parallel by a method based upon multicontext technique, six configuration memories are required. As a result, there is caused deterioration of the performance related to processing that the scale of the programmable logic circuit sector is remarkably enlarged and the RC time constant becomes 3.7 times.

In the meantime, no deterioration of the performance of the circuit is caused by a method in the embodiment of the invention as already described.

In the concrete example described above, the number of records including one block is fixed, however, it is not necessarily required that one block includes the fixed number of records if only the break of each block is clear. For example, in case data compressed according to JPEG is expanded and decoded, each block to be expanded and decoded is required to be variable length.

As described above, according to the invention, hardware processing can be implemented wherein time required for reconfiguring the programmable logic device is reduced without requiring an extra configuration memory for storing plural circuit information pieces like conventional type multicontext technique and total processing time including circuit reconfiguration time is shorter than that in software processing. As a result, a high-speed and miniaturized information processor using reconfigurable computing based upon cache logic technique can be realized.

Also, as an extra configuration memory is not required in the programmable logic circuit sector like conventional type multicontext technique, the programmable logic device based upon multicontext technique can be realized without causing deterioration of the performance of the circuit and the increase of power consumption respectively caused by the increase of wiring load capacity caused by arranging an extra configuration memory.

Also, plural processing can be executed in parallel without causing a stall and as a result, the high-speed and miniaturized information processor using reconfigurable computing based upon cache logic technique can be realized.

Also, as the programmable logic device according to the invention can use the programmable logic circuit sector provided with the same structure as that in the conventional type programmable logic device, it can be easily realized using the design of the conventional type programmable logic device.

Also, the programmable logic device according to the invention can be realized using the conventional type programmable logic device by including the data cache of the programmable logic device according to the invention in the programmable logic device without newly producing a circuit.

What is claimed is:

1. A data processing method, by a programmable logic device, for sequentially processing input data divided into blocks in unit of blocks in plural circuits using the programmable logic device including a programmable logic circuit sector and a data cache, the programmable logic circuit sector being provided with a circuit element and a configuration memory connected to the circuit element, and being configured using the circuit element based upon circuit information written to the configuration memory, the data cache temporarily storing data processed in a circuit configured based upon the circuit information, the method comprising:

performing a first configuration in which circuit information of a first circuit among the plural circuits is written to the configuration memory and the first circuit is configured in the programmable logic circuit sector;

performing a first processing in which plural blocks which can be stored in the data cache of the input data are sequentially processed in the first circuit in unit of the blocks and data in unit of the blocks of the result of the first processing are sequentially stored in the data cache;

performing a next configuration in which circuit information of a next circuit among the plural circuits is written to the configuration memory and the next circuit is configured in the programmable logic circuit sector;

performing a next processing in which data stored in the data cache are sequentially processed in unit of the blocks in the circuit configured in the next configuration and data in unit of the blocks of the result of the next processing are seciuentially stored in the data cache; and performing an output processing in which the next configuration and the next processing are repeated to the last circuit of the plural circuits and the result of the processing in the last circuit is outputted to an external device as output data, wherein the operation from the first configuration to the output processing is executed for the whole input data per unit of the plural blocks of the input data.

2. A data processing method by a programmable logic device according to claim 1, further comprising:

performing data count in which the number of processed blocks of input data is stored and the termination of the processing of the whole input data is detected.

3. A data processing method by a programmable logic device according to claim 1, further comprising:

performing cache count in which the number of blocks stored in the data cache is stored and the termination of a processing cycle is detected.

4. An information processing system in which at least part of processing by an application program is processed in a programmable logic device, wherein the data processing method of claim 1 is applied to the programmable logic device.

5. A programmable logic device, comprising:
   a programmable logic circuit sector sequentially processing input data in unit of blocks, the programmable logic circuit sector provided with a circuit element and a configuration memory connected to the circuit element in which a circuit is configured based upon circuit information written to the configuration memory;
   a circuit information input controller that writes circuit information to the configuration memory; and
   a data cache that temporarily stores a plurality of blocks of data processed in the circuit configured based upon the circuit information written to the configuration memory, wherein the data cache sequentially stores the plurality of blocks of data output from a first circuit configured based upon first circuit information written to the configuration memory and sequentially outputs the stored blocks of data to a second circuit configured based upon second circuit information written to the configuration memory as input data to the second circuit.

6. A programmable logic device according to claim 5, wherein the data cache is provided inside the programmable logic circuit sector using the circuit element of the programmable logic circuit sector.

7. A programmable logic device according to claim 5, wherein the circuit information input controller changes at least part of the circuit configuration of the circuit element of the programmable logic circuit sector by writing input circuit information to at least part of the configuration memory.

8. An information processing system in which at least part of processing by an application program is processed by a programmable logic device, wherein the programmable logic device of claim 5 is used for the programmable logic device.

9. A programmable logic device, comprising:
   a programmable logic circuit sector provided with a circuit element and a configuration memory connected to the circuit element in which a circuit is configured based upon circuit information written to the configuration memory;
   a circuit information input controller that writes circuit information to the configuration memory;
   a data cache that temporarily stores a plurality of blocks of data processed in the circuit configured based upon the circuit information written to the configuration memory, wherein the data cache sequentially stores the plurality of blocks of data output from a first circuit configured based upon first circuit information written to the configuration memory and sequentially outputs the stored blocks of data to a second circuit configured based upon second circuit information written to the configuration memory as input data to the second circuit;
   an input data switch that sequentially supplies either of data from the data cache or input data in unit of the blocks to the circuit configured based upon the circuit information written to the configuration memory; and
   an output data switch that supplies data output from the circuit configured based upon the circuit information written to the configuration memory to the data cache or outputs it as output data.

10. A programmable logic device according to claim 9, wherein the input data switch and the output data switch are provided inside the programmable logic circuit sector using the circuit element of the programmable logic circuit sector.

11. A method for reconfiguring a circuit in a programmable logic device and for sequentially processing input data divided into blocks by plural circuits and outputting a result, the programmable logic device including a programmable logic circuit sector and a data cache, the programmable logic circuit sector being provided with a circuit element and a configuration memory connected to the circuit element, and being configured using the circuit element based upon circuit information written to the configuration memory, the data cache temporarily storing data processed in a circuit configured based upon the circuit information, the method, when the processing of the input data in the unit of the block sequentially is performed in unit of the blocks in each circuit, comprising:
   performing a first circuit configuration in which a first circuit is configured based upon circuit information of the first circuit among the plural circuits in the programmable logic circuit sector;
   performing a next circuit configuration in which, after the circuit configured in the programmable logic circuit sector processes plural blocks which can be stored in the data cache of the input data and the result of the processing is stored in the data cache, the next circuit is configured based upon circuit information of the next circuit;
   repeating the next circuit configuration process to the last circuit of the plural circuits; and
   after the last circuit is configured in the programmable logic circuit sector and the result of the processing in the last circuit is output to an external device as output data, repeating the first circuit configuration and steps subsequent thereto until the processing of the whole input data is finished.

* * * * *